(12) United States Patent
Rosenkrantz et al.

(10) Patent No.: US 9,721,167 B2
(45) Date of Patent: Aug. 1, 2017

(54) BIOMETRIC NOTIFICATION SYSTEM

(71) Applicant: FACEFIRST, INC., Westlake Village, CA (US)

(72) Inventors: Joseph Ethan Rosenkrantz, Calabasas, CA (US); Gifford Hesketh, Newbury Park, CA (US)

(73) Assignee: FaceFirst, Inc., Westlake Village, CA (US)

( * ) Notice: Subject to any disclaimer, the term of this patent is extended or adjusted under 35 U.S.C. 154(b) by 0 days.

(21) Appl. No.: 15/050,326

(22) Filed: Feb. 22, 2016

(65) Prior Publication Data

US 2016/0224841 A1  Aug. 4, 2016

Related U.S. Application Data

(63) Continuation-in-part of application No. 14/612,207, filed on Feb. 2, 2015, which is a continuation-in-part of application No. 12/177,103, filed on Jul. 20, 2008, now Pat. No. 9,141,863.

(60) Provisional application No. 62/128,639, filed on Mar. 5, 2015.

(51) Int. Cl.
*G06K 9/00* (2006.01)
*G06F 17/30* (2006.01)

(52) U.S. Cl.
CPC ..... *G06K 9/00771* (2013.01); *G06F 17/3028* (2013.01); *G06F 17/30247* (2013.01); *G06K 9/00268* (2013.01); *G06K 9/00288* (2013.01); *G06K 9/00885* (2013.01); *G06K 9/00979* (2013.01)

(58) Field of Classification Search
CPC .......... G06K 9/00979; G06K 9/00288; G06K 9/00885; G06K 9/00268; G06K 9/00771; G06F 17/3028; G06F 17/30247
See application file for complete search history.

(56) References Cited

U.S. PATENT DOCUMENTS

| | | |
|---|---|---|
| 5,561,718 A | 10/1996 | Trew et al. |
| 6,038,337 A | 3/2000 | Lawrence et al. |
| 6,182,076 B1 | 1/2001 | Yu et al. |
| 6,185,316 B1 | 2/2001 | Buffam |
| 6,819,783 B2 | 11/2004 | Goldberg et al. |
| 7,099,899 B2 | 8/2006 | Choy et al. |
| 7,277,891 B2 | 10/2007 | Howard et al. |
| 7,369,685 B2 | 5/2008 | DeLean et al. |
| 7,593,605 B2 | 9/2009 | King et al. |
| 7,647,595 B2 | 1/2010 | Chandrasekaran |
| 7,680,912 B1 | 3/2010 | McNabb et al. |
| 7,720,463 B2 | 5/2010 | Marsico et al. |
| 7,772,972 B2 | 8/2010 | Kuroda et al. |
| 7,933,451 B2 | 4/2011 | Kloer et al. |
| 7,944,468 B2 * | 5/2011 | Hoffman .......... G08B 13/19608 348/143 |
| 7,999,857 B2 | 8/2011 | Bunn et al. |

(Continued)

*Primary Examiner* — Chan Park
*Assistant Examiner* — Mia M Thomas
(74) *Attorney, Agent, or Firm* — Paul D. Chancellor; Ocean Law

(57) ABSTRACT

The present invention provides a biometric notification system for selectively sending messages to interested recipients. In various embodiments, message trigger criteria, interested recipients, and message content may vary depending upon, among other things, the service being provided.

14 Claims, 15 Drawing Sheets

(56) References Cited

U.S. PATENT DOCUMENTS

| | | | |
|---|---|---|---|
| 8,131,012 B2* | 3/2012 | Eaton | G06K 9/00771 340/573.1 |
| 8,170,283 B2* | 5/2012 | Cobb | G06K 9/00335 340/948 |
| 8,200,011 B2* | 6/2012 | Eaton | G06K 9/00335 382/103 |
| 8,254,699 B1 | 8/2012 | Zhao et al. | |
| 8,305,441 B2* | 11/2012 | Boghossian | G06K 9/00771 348/143 |
| 8,308,562 B2 | 11/2012 | Patton | |
| 8,601,494 B2* | 12/2013 | Brown | G06Q 10/10 715/700 |
| 8,774,471 B1 | 7/2014 | Laaser et al. | |
| 8,798,375 B1 | 8/2014 | Chang et al. | |
| 9,141,863 B2* | 9/2015 | Rosenkrantz | G06K 9/00885 |
| 9,158,975 B2* | 10/2015 | Lipton | G06K 9/00771 |
| 9,317,908 B2* | 4/2016 | Seow | G06T 5/009 |
| 9,405,968 B2* | 8/2016 | Rosenkrantz | G06K 9/00288 |
| 9,507,768 B2* | 11/2016 | Cobb | G06F 17/2785 |
| 2002/0194287 A1 | 12/2002 | Tyra et al. | |
| 2003/0084305 A1 | 5/2003 | Siegel et al. | |
| 2003/0126121 A1 | 7/2003 | Khan et al. | |
| 2003/0133614 A1 | 7/2003 | Robins et al. | |
| 2003/0149343 A1 | 8/2003 | Siegel et al. | |
| 2003/0158957 A1 | 8/2003 | Abdolsalehi | |
| 2003/0163233 A1 | 8/2003 | Song et al. | |
| 2004/0064453 A1* | 4/2004 | Ruiz | G06F 21/32 |
| 2004/0117638 A1* | 6/2004 | Monroe | G06K 9/00221 713/186 |
| 2004/0133582 A1 | 7/2004 | Howard et al. | |
| 2004/0151347 A1 | 8/2004 | Wisniewski | |
| 2004/0156535 A1 | 8/2004 | Goldberg et al. | |
| 2004/0225681 A1 | 11/2004 | Chaney et al. | |
| 2004/0263314 A1* | 12/2004 | Dorai | G06F 21/32 340/5.2 |
| 2005/0060232 A1 | 3/2005 | Maggio | |
| 2005/0062602 A1 | 3/2005 | Fujiwara et al. | |
| 2005/0104727 A1* | 5/2005 | Han | G06K 9/00335 340/541 |
| 2005/0110637 A1 | 5/2005 | Rao | |
| 2005/0128304 A1 | 6/2005 | Manasseh et al. | |
| 2005/0138042 A1 | 6/2005 | Foo et al. | |
| 2005/0207622 A1 | 9/2005 | Haupt et al. | |
| 2005/0271250 A1 | 12/2005 | Vallone et al. | |
| 2005/0273621 A1 | 12/2005 | Davis | |
| 2005/0273627 A1 | 12/2005 | Davis | |
| 2005/0283617 A1 | 12/2005 | Davis | |
| 2005/0288952 A1 | 12/2005 | Davis | |
| 2006/0016107 A1 | 1/2006 | Davis | |
| 2006/0020630 A1 | 1/2006 | Stager et al. | |
| 2006/0024655 A1 | 2/2006 | Bambrick et al. | |
| 2006/0029296 A1 | 2/2006 | King et al. | |
| 2006/0161588 A1 | 7/2006 | Nomoto | |
| 2006/0190419 A1 | 8/2006 | Bunn et al. | |
| 2007/0124785 A1 | 5/2007 | Marsico et al. | |
| 2007/0248244 A1 | 10/2007 | Sato et al. | |
| 2007/0273497 A1 | 11/2007 | Kuroda et al. | |
| 2008/0080743 A1 | 4/2008 | Schneiderman et al. | |
| 2008/0082546 A1 | 4/2008 | Meijer et al. | |
| 2008/0169919 A1 | 7/2008 | Sato et al. | |
| 2009/0092283 A1 | 4/2009 | Whillock et al. | |
| 2009/0110246 A1 | 4/2009 | Olsson et al. | |
| 2009/0141940 A1 | 6/2009 | Zhao et al. | |
| 2009/0169116 A1 | 7/2009 | Iizuka et al. | |
| 2009/0243844 A1 | 10/2009 | Ishidera | |
| 2009/0248587 A1 | 10/2009 | Van Buskirk | |
| 2009/0270170 A1 | 10/2009 | Patton | |
| 2009/0327288 A1 | 12/2009 | Silverman et al. | |
| 2010/0014717 A1 | 1/2010 | Rosenkrantz | |
| 2010/0142764 A1 | 6/2010 | Ikegami | |
| 2010/0316262 A1 | 12/2010 | Kuwahara | |
| 2010/0318417 A1 | 12/2010 | Brisebois et al. | |
| 2011/0276638 A1* | 11/2011 | Errico | G06Q 10/107 709/206 |
| 2012/0198043 A1* | 8/2012 | Hesketh | H04L 29/1265 709/223 |
| 2013/0083975 A1 | 4/2013 | Partington et al. | |
| 2014/0254890 A1 | 9/2014 | Bergman et al. | |
| 2016/0335513 A1* | 11/2016 | Rosenkrantz | G06K 9/00288 |

* cited by examiner

FIG. 4

| 402 | | |
|---|---|---|
| Processing Facility Functions | Obtain Facial Feature Set | 404 |
| | Compare Facial Feature Sets | 406 |
| | Determine Interested Recipients | 408 |
| | Determine Message Content | 410 |
| | Other | 412 |

| 502 | | |
|---|---|---|
| Database Facility Functions | Case Database (e.g., name, image, 2nd facial feature sets, case group, other) | 504 |
| | Subset(s) of Case Database | 506 |
| | Other Database(s) (e.g., recipient pool) | 508 |
| | Subset(s) of Other Database(s) | 510 |
| | Search Engine | 512 |
| | Other | 514 |

500

| Case Indicia |
| --- |
| 1. Name of a person |
| 2. Image of the person |
| 3. Facial feature set |
| 4. Case group |
| 5. Location alert |

| Trigger Criteria | Description |
| --- | --- |
| 1. Match | Facial feature set of facial image in video frame is matched with a case |
| 2. Other Criteria | |
| a) Location | For example, a particular site or zone |
| b) Case Group | For example, a very important person "VIP" |

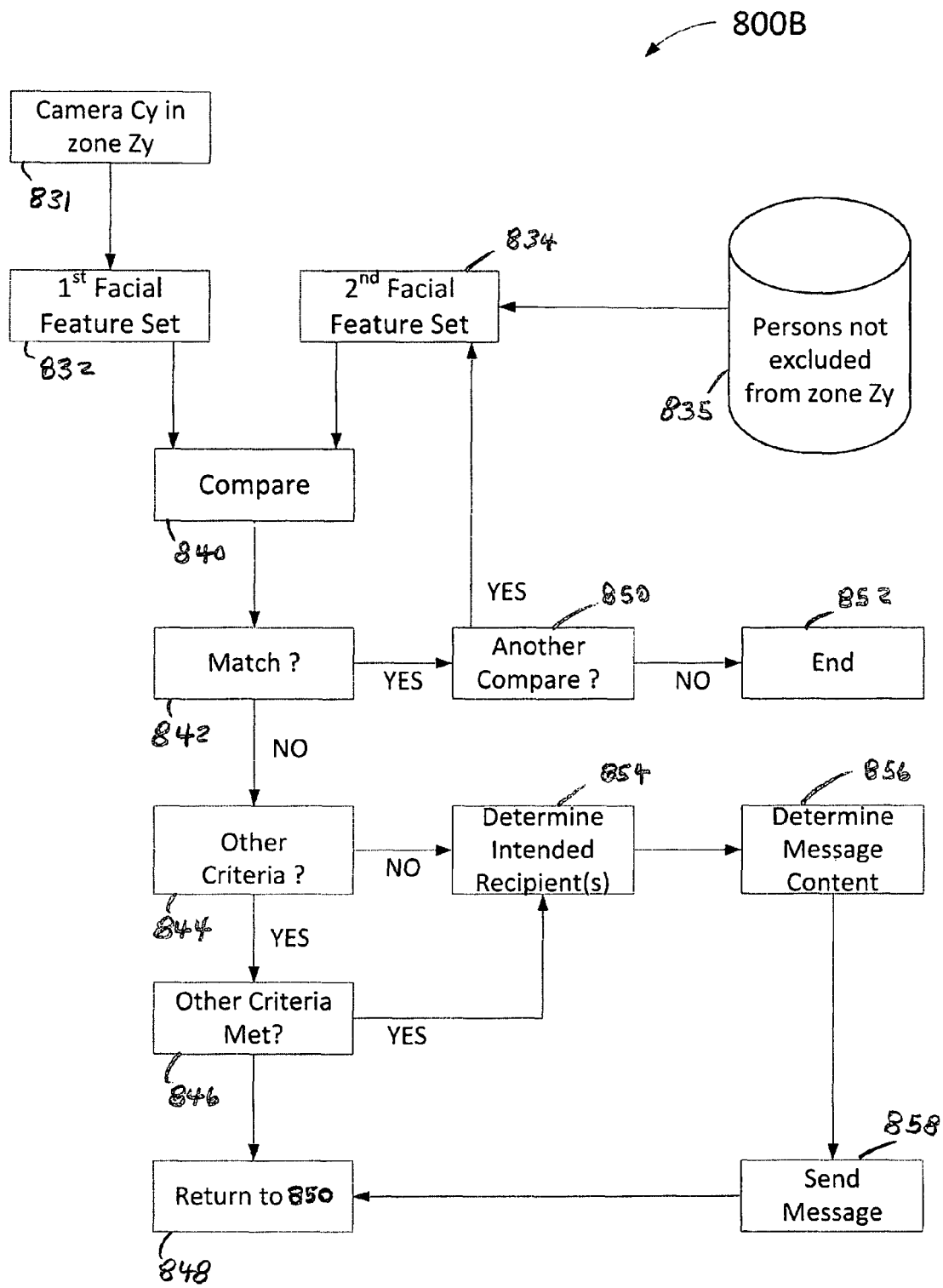

FIG. 11F
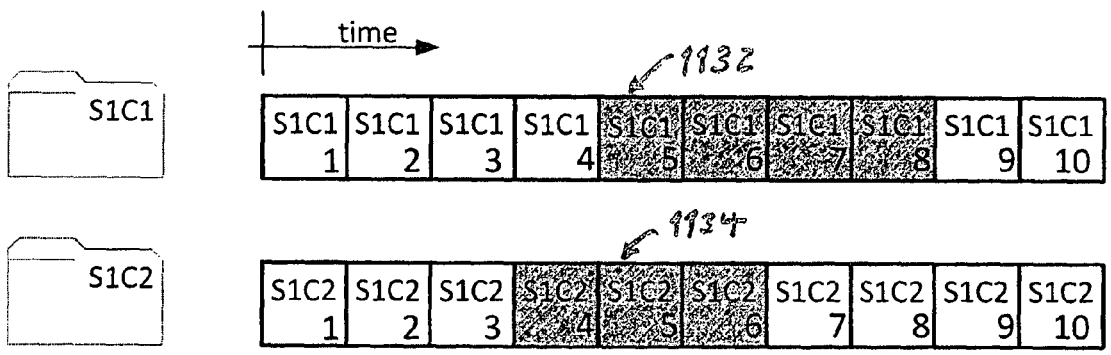
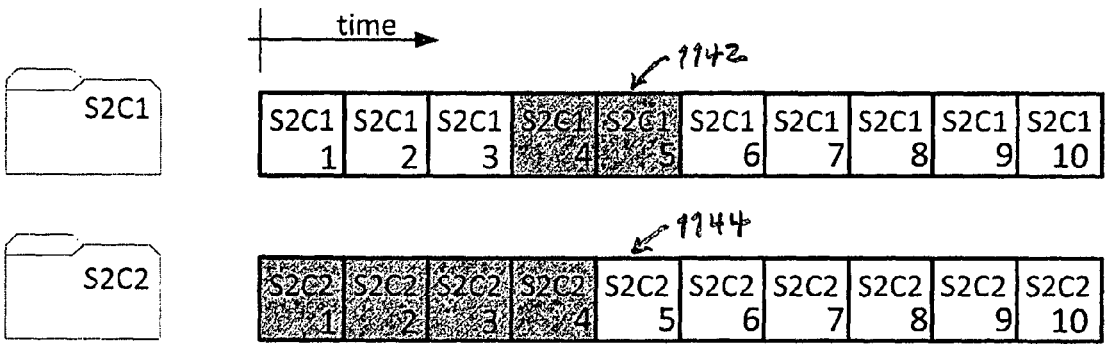
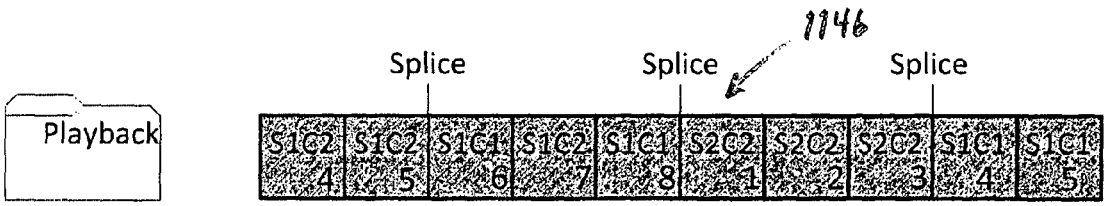

BIOMETRIC NOTIFICATION SYSTEM

PRIORITY CLAIM AND INCORPORATION BY REFERENCE

This application claims the benefit of U.S. Prov. Pat. App. No. 62/128,639 filed Mar. 5, 2015. This application is a continuation-in-part of Ser. No. 14/612,207 filed Feb. 2, 2015 which is a continuation of U.S. patent application Ser. No. 12/177,103 filed Jul. 20, 2008 now U.S. Pat. No. 9,141,863, both of which are incorporated herein in their entireties and for all purposes.

U.S. Pat. No. 5,561,718 issued Oct. 1, 1996, U.S. Pat. No. 6,038,337 issued Mar. 14, 2000, U.S. Pat. No. 8,254,699 issued Aug. 28, 2012 and U.S. Pat. No. 8,798,375 issued Aug. 5, 2014 are incorporated herein in their entireties and for all purposes.

BACKGROUND OF THE INVENTION 1.0 Field of the Invention

The invention relates to a notification system. More particularly, the invention relates to systems and methods that acquire and process biometric information for discovering and acting on matched biometric feature sets.

2.0 Discussion of the Related Art

Current facial recognition based biometric systems typically offer little more than a face comparison used primarily for the purpose of identifying an unknown person.

SUMMARY OF THE INVENTION

The present invention provides a biometric notification system for selectively sending messages to interested recipients. In various embodiments, message trigger criteria, interested recipients, and message content may vary depending upon, inter alia, the service being provided.

An embodiment provides a biometric notification system ("BNS") with facial recognition and related services, the system comprising: plural digital video cameras ($C_1$, $C_2$ . . . $C_n$) that monitor respective zones ($Z_1$, $Z_2$ . . . $Z_n$) at a first site; a data processing system including a processing facility and a database facility; a network interconnecting the video cameras and the data processing facility; a video frame acquired from a video camera $C_x$ in zone $Z_x$ includes a first content; a first facial feature set derived from the first content; a database of the database facility includes plural cases, each case identifies a person by linking a name with a second content, a second facial feature set, and a case group; a matched case discovered when the processing facility finds the first feature set matches a second feature set; and, a message sent to one or more interested recipients when the processing facility finds that message trigger criteria are met; wherein message trigger criteria include a requirement that a matched case is discovered.

BRIEF DESCRIPTION OF THE DRAWINGS

The present invention is described with reference to the accompanying figures. These figures, incorporated herein and forming part of the specification, illustrate embodiments of the invention and, together with the description, further serve to explain its principles enabling a person skilled in the relevant art to make and use the invention.

FIG. 4 shows functions of a processing facility of the biometric notification system of FIG. 1

FIG. 5 shows functions of a database facility of the biometric notification system of FIG. 1.

FIGS. 8A-B show an embodiment of the biometric notification system of FIG. 1 configured to provide geofencing services.

FIGS. 11A-F show an embodiment of the biometric notification service of FIG. 1 configured to provide archive services.

DETAILED DESCRIPTION OF PREFERRED EMBODIMENTS

The disclosure provided herein describes examples of some embodiments of the invention. The designs, figures, and descriptions are non-limiting examples of the embodiments they disclose. For example, other embodiments of the disclosed device and/or method may or may not include all of the features described herein. Moreover, disclosed advantages and benefits may apply to only certain embodiments of the invention and should not be used to limit the disclosed invention.

Figure 1:
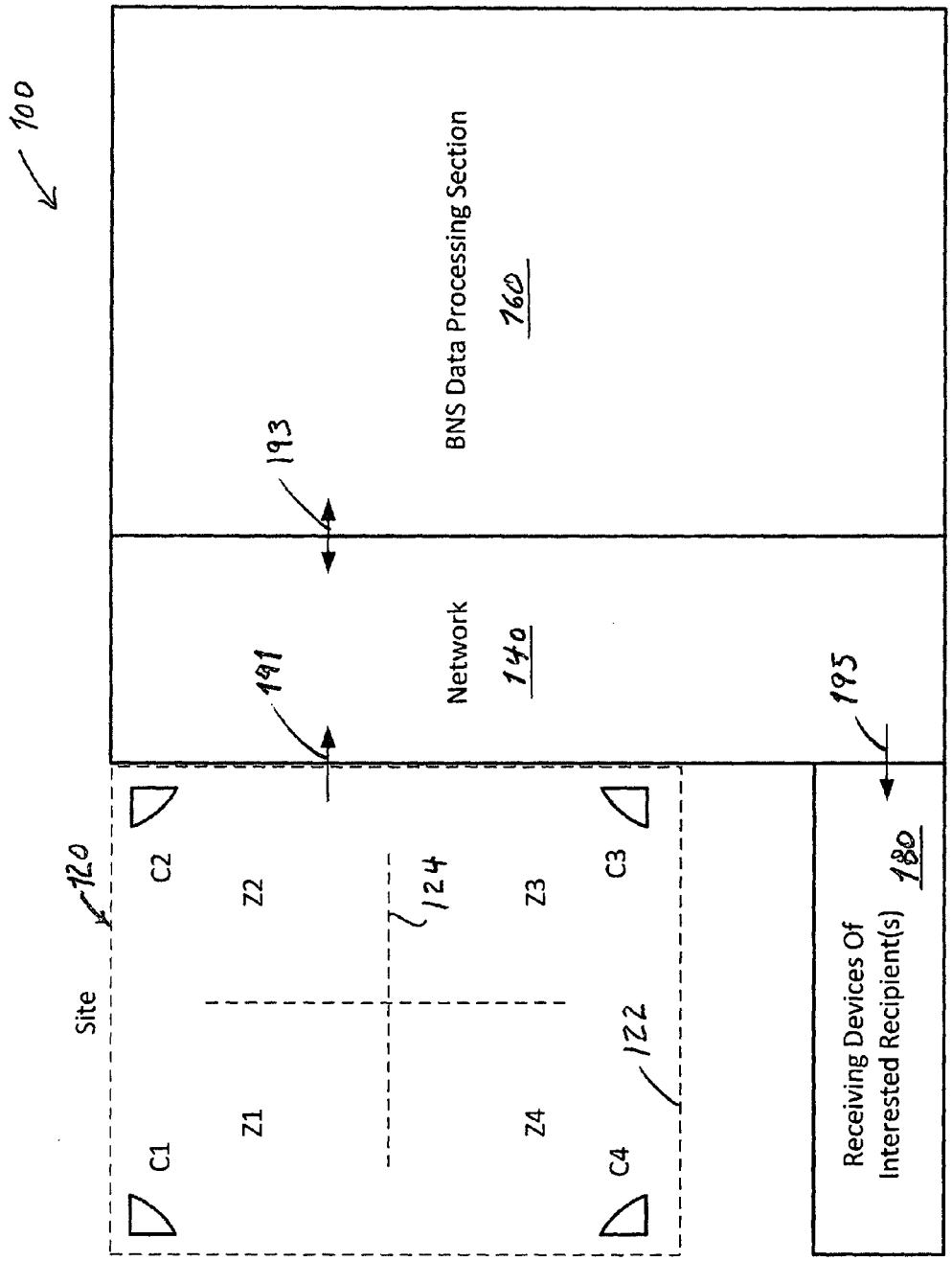
FIG. 1 shows a biometric notification system implemented for a site.

FIG. 1 shows an embodiment of the biometric notification system ("BNS") of the present invention 100. As shown, a network 140 receives data 191 from a site 120, and passes data 193 to a data processing system ("DPS") 160. The receiving devices of interested recipients 180 receive data 195 from the network.

The site is an area of interest, for example a structure such as building or a portion thereof. As shown, site 120 includes external and internal boundaries such as external walls 122 and internal walls 124. Digital video cameras C1-C4 are arranged to cover respective zones Z1-Z4.

The network provides a means for exchanging electronic information. Transport media include any of wire (e.g., copper), fiber (e.g., glass), or wireless such as a cellular network or an IEEE 802 network. Data 191, 193, 195 exchanged with the network 140 may be transported by any suitable means.

Data processing system functions include analyzing and acting on available data. As shown, digital video camera data such as video frames from cameras C1-C4 acquired at the site 120 are available to the data processing system 160 via the network 140. See for example site data 191 received by the network and network data 193 passed to the data processing system. In various embodiments data available from the cameras and/or ancillary devices includes one or more of a site identifier, camera identifier, zone identifier, and a date/time associated with each video frame. The date/time "stamp" of a video frame may be referenced to a common time standard such as UTC ("temps universel coordonné") or GMT (Greenwich Mean Time).

Receiving devices of interested recipients 180 may include the devices of site personnel and/or non-site personnel. Identification of interested recipients and/or their receiving devices may depend upon results obtained when the data processing system 160 processes site data 191. As shown, the receiving devices of interested recipients 180 receive data 195 from the network 140.

In an embodiment, receiving devices of interested recipients 180 may be particular devices assigned to particular persons, the same being known to the DPS 160, such that a message sent to a particular device always reaches a particular person. In another embodiment, receiving devices of interested recipients 180 may be associated with a particular user group such that a message sent to a particular device always reaches a person(s) in the user group. In yet other embodiments, messages are sent via an addressing scheme and/or service such as a telephone number, text message, email address, short messaging service ("SMS"), public network, private network, or another suitable service utilizing an address available to the DPS.

As skilled artisans will appreciate, any of the data exchanges with the network may be bidirectional. For example, the bidirectional data exchange 193 between the network 140 and the data processing system 160 may provide for delivery of site data 191 to the data processing system and for delivery of data processing system data or results 195 to the receiving devices of interested recipients 180.

Figure 2:
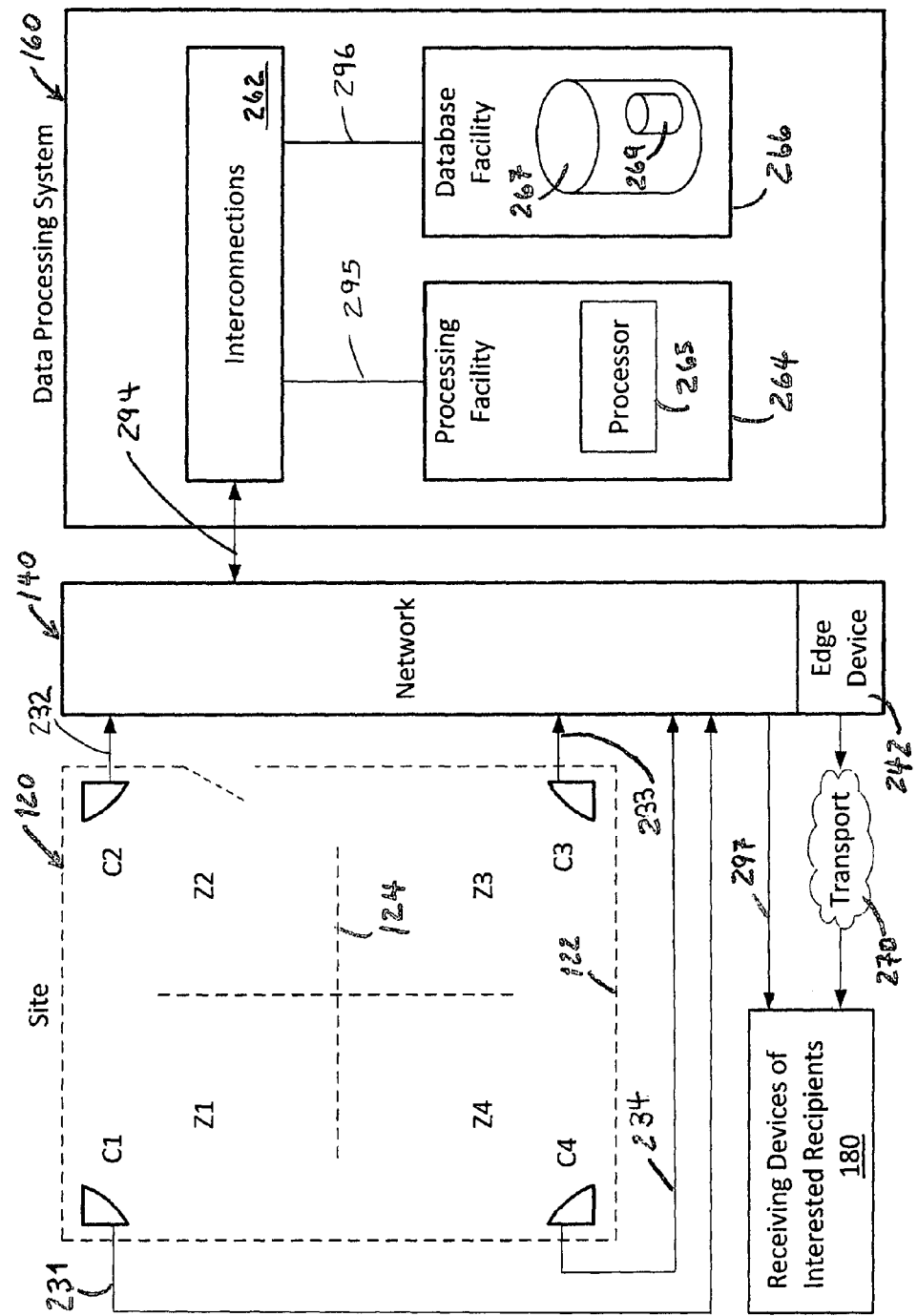
FIG. 2 shows the biometric notification system of FIG. 1 in further detail.

FIG. 2 shows an embodiment 200 of the biometric notification system of FIG. 1. As shown, a network 140 receives data from a site 120. The site data includes data acquired from cameras C1-C4 via one or respective (as shown) transport media 231-234 extending between the cameras and the network. In some embodiments the transport media are interconnected with the network via a network switch such as an Ethernet switch.

The data processing system 160 receives site camera data from the network 140 via a bidirectional data link 294 therebetween. Embodiments of the data processing system 160 include an interconnection 262 for exchanging data with each of the network, a processing facility 264 and a database facility 266 via respective data links 294, 295, 296. In some embodiments, the interconnection 262 is provided at least in part by a server backplane.

Processing facility 264 embodiments may include one or more processors 265 and respective or shared complementary devices such as memory, input/output, and similar devices. In an embodiment, the processing facility includes processor(s) or server(s) for one or more of extracting facial feature sets, comparing facial feature sets, determining the receiving devices of interested recipients, and constructing messages.

Database facility 266 is for storing at least one database 267. Database facility embodiments may utilize any type of memory suited to the tasks mentioned above or below, including one or more of semiconductor memory such as random access memory and solid state drives, optical memory such as optical drives, and magnetic memory such as hard disk drives. In various embodiments, the database facility includes one or more of a hard drive array, a solid state drive array, a search engine, and a database server. Database facility embodiments include, among others, database facilities with database hardware collocated with a site, database hardware distributed among multiple different sites, and database hardware that is centralized to support multiple sites.

Receiving devices 180 are for receiving messages from the network 140. In various embodiments, receiving devices are capable of receiving one or more of text, graphics, pictures, motion pictures, symbols, and audio. For example, receiving devices include any of wired and wireless devices such as telephones, cellular telephones, interconnected computing devices, and non-cellular radio frequency devices.

Where messages are transported to recipients geographically distant from the site, off-site transmissions means include wide area networks, virtual private networks, Internet infrastructure, private wired transmission means, private wireless transmission means and the like. In an embodiment, a network edge device such as a router 242 provides Internet connectivity for transport 270 of the message to the receiving device. And, in an embodiment, the message is transported via transport media local to the site 297.

Figure 3A:
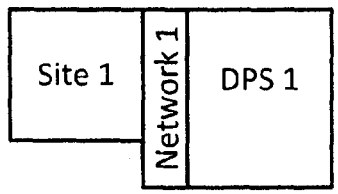
FIGS. 3A-C show the biometric notification system of FIG. 1 implemented for single and multiple sites.
Figure 3B:
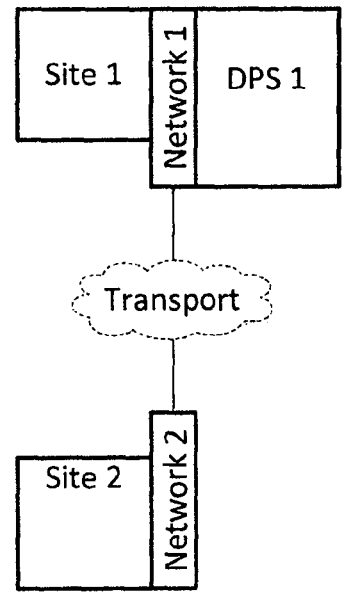
Figure 3C:
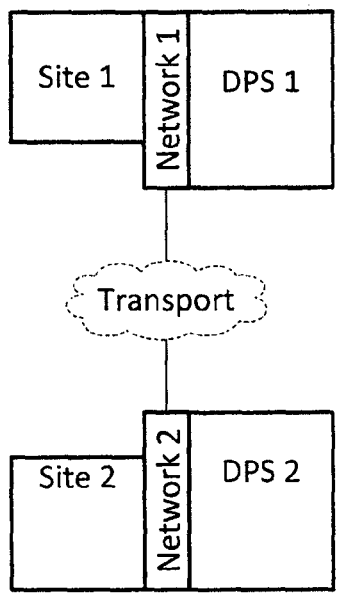

The biometric notification system embodiments of FIGS. 1-2 may monitor single or multiple sites with respective or shared networks and data processing systems. FIGS. 3A-C illustrate some of these embodiments 300A-C.

FIG. 3A shows a biometric notification system supporting a single site 300A. As shown, Site 1 is supported by a respective Network 1 and DPS 1 (Data Processing System 1).

FIG. 3B shows a biometric notification, system supporting two sites 300B. As shown, Sites 1 and 2 with respective Networks 1 and 2 share a single DPS 1. A data Transport Link such as transport via the Internet provides a means for interconnecting the two networks.

FIG. 3C shows a biometric notification system supporting two sites 300C. As shown, Sites 1 and 2 have respective Networks 1 and 2 and respective DPS 1 and DPS 2. A data Transport Link such as transport via the Internet provides a means for interconnecting the two networks.

FIG. 4 shows functions of the processing facility 400. Processing facility functions 402 provide for one or more of (i) obtain a facial feature set 404, (ii) compare facial feature sets 406, (iii) determine interested recipients 408, (iv) determine message content 410, and (v) other processing facility features 412.

Obtaining a facial feature set 404 provides a basis for matching and/or identifying a person that appears in an image such as a video frame. This function may include one or both of isolating a face image as from a video frame and characterizing the face image via a facial feature set.

Face images may be isolated by techniques known to skilled artisans. For example, by pattern recognition wherein characteristic facial outlines are used to discover the boundaries of a facial image within a frame including content unrelated to the facial image. Means for isolating face images includes those disclosed in U.S. Pat. No. 8,121,349 filed Aug. 31, 2009 which is now incorporated herein by reference in its entirety and for all purposes.

Facial feature sets may be prepared by techniques known to skilled artisans. For example, metrics such as the relationship among characteristic facial measurements, e.g., eye spacing versus ear spacing, may be used to build a facial feature set with numeric values of multiple such relationships. Means for preparing facial feature sets include those disclosed in U.S. Pat. No. 5,835,616 filed Jun. 17, 1994 and U.S. Pat. Pub. 2008/0193020 published Aug. 14, 2008, all of which are now incorporated herein by reference in their entireties and for all purposes.

Comparing facial feature sets 406 may be compared by quantifying their differences, as by determining how individual or combined numeric facial feature metrics differ and in particular on the magnitude of such differences. In an embodiment, first and second facial feature set metrics are quantified by respective equations as by curve fitting or similar techniques and the equations are manipulated by known techniques to assess the likelihood that the persons represented by the facial feature sets are the same person. Curve fitting techniques include least squares curve fits, polynomial curve fits, and interpolating polynomial curve fits.

In various embodiments, a facial feature set is prepared for a person appearing in a video frame acquired by one of the video cameras C1-C4 and in various embodiments the acquired facial feature set is compared with the facial feature set of a case in the case database 504. Other comparisons include case to case comparison, imported facial feature set to case comparison, and imported facial set to imported facial feature set comparison.

Determination of interested recipients 408 identifies persons or devices for whom a message is intended. Interested recipients may be included in a pool of recipients known to the BNS, for example by inclusion in one of the other databases 412. In an embodiment, a case in the case database 504 is characterized by a case group (e.g., "shoplifters") and interested recipients are identified as a recipient group (e.g., "security") associated with the case group. Interested recipients may also be identified based on any of the site, time/date, function, job function, location, present location and more as is further described below.

In some embodiments, an interested recipients unknown to the BNS may be the intended recipient of a message. For example, where an acquired image is matched with a case, the BNS may utilize non-BNS resources such as the Internet to find the parole status of the person identified by the case and an electronic address such as an email address of the person's parole officer.

Determination of message content 410 assembles information that corresponds to the matched case. This content may include any of a written message such as a textural or symbolic message, graphics, images, links or hyperlinks to related content, audio, and device instructions or commands. Message content may be selected based on the interested recipient, the matched person, case group, the site, time/date, function, job function, location, present location and more as is further described below.

Other processing facility functions 412 may also be provided. For example, access to the BNS may be selectively granted to subscribers. Additional processing facility functions are further described below.

FIG. 5 shows functions of the database facility 500. Database facility functions 502 provide for one or more of (i) a case database 504, (ii) subset(s) of a case database 506, (iii) other database(s) 508, (iv) subset(s) of other database(s) 510, (v) a search engine 512, and (vi) other database facility features 514.

Case database 504 contents include information about persons. In various embodiments, the case database includes hundreds of cases. And, in various embodiments, each case includes a facial feature set and may include one or more of a corresponding name, image, and case group. In an embodiment, for a plurality of cases, each case identifies a person by name, image, facial feature set, and one or more case groups. And, in an embodiment, all of the cases of the case database that are available for matching identify a person by name, image, facial feature set, and one or more case groups.

Subsets of case database 506 present a more limited universe of cases available for matching. For example, a subset may contain all of the cases identified by the "shoplifters" case group.

Other databases and subsets 508, 510 of these databases provide a means of recording additional subject matter available to the BNS. For example any of people, instructions, and video footage may be recorded in such a database or database subset. As mentioned above, an other database may be used to record pools of potential message recipients. In some embodiments, other databases are created and or populated "on the fly" as may occur when stream(s) of video frames are to be recorded.

Search engine 512 provides a data processing function. In particular, the search engine can respond to queries posed to the case 504 or other databases 508. Rationale for inclusion of a search engine may include one or more of multiple factors including speed, sharing of databases, modularity, and geography. For example, where all or some part of the database facility 266 is remote from the processing facility 264 as in another city or state, the database facility can respond to queries using the search engine. In some embodiments the search engine functionality is provided by a database server.

Other database facility functions 514 may also be provided. For example, access to the database may be selectively granted to subscribers. Additional database facility functions are further described below.

Figure 6:
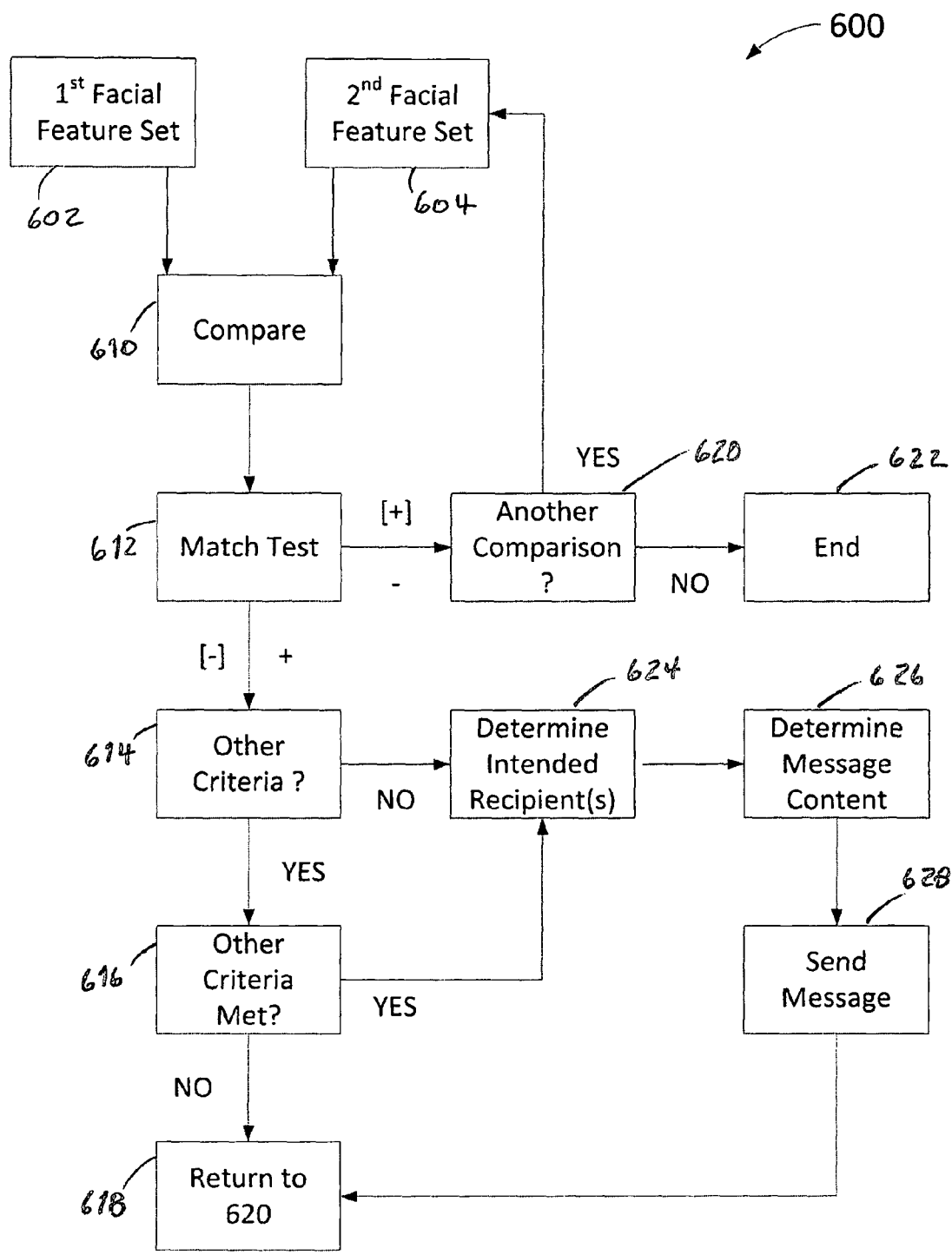
FIG. 6 shows a process of the biometric notification system of FIG. 1 useful for identifying interested recipients.

FIG. 6 illustrates a first process that may be used in notifying interested recipients 600. Execution of this process may result in the delivery of one or more messages to one or more interested recipients. And in various embodiments, this process may be used to limit message recipients by particularly identifying one or more persons and/or receiving devices to which the message will be sent.

A first facial feature set 602 and a second facial feature set 604 are passed to a compare step 610. For example, (i) the first facial feature set is derived from a video frame acquired by a camera C1-C4 using the processing facility function to obtain the facial feature set 404 and (ii) the second facial feature set that of a case in the case database 504. In various embodiments, second facial feature sets available for comparison may be limited to the case database 504, a subset of the case database 506, or they may be obtained from another database or resource apart from the case database.

The first and second facial sets are compared 406 in a compare step 610 to determine if there is a match. If there is no match, and another second facial feature set is available for comparison with the first facial feature set 620, the process proceeds with this comparison 610. Where no additional second facial feature sets are available for comparison, the process may end 622.

A match test step 612 may test for the presence of a match "+" or for the absence of a match "−". For example, where sending a message depends upon finding a match, these symbols are not bracketed. And, where sending a message depends on failure to find a match, these symbols are bracketed. Alternative match tests provide for, inter alia, sending a message based on: (i) the discovery of a person identified by a second facial feature set available for comparison "+, −"; or (ii) discovery of a person not identified by a second facial feature set available for comparison "[+], [−]".

When the match test is satisfied, a message may be sent 628 subject to any other criteria 614 and meeting any such other criteria 616. For example other criteria may include a case group test which may be met or not. Failure to meet other criteria may cause a return to the "another comparison?" step. Executing the "send message" step 628 may cause a return to the "another comparison?" step 618. In various embodiments where the match test is satisfied and other criteria, if any, are met, interested recipients may be determined 624 and message content may be determined 626 as steps prior to sending a message 628.

FIGS. 7A-D illustrate features of a BNS location awareness or zone alert service 700A-D.

Figures 7A, 7B, 7C:
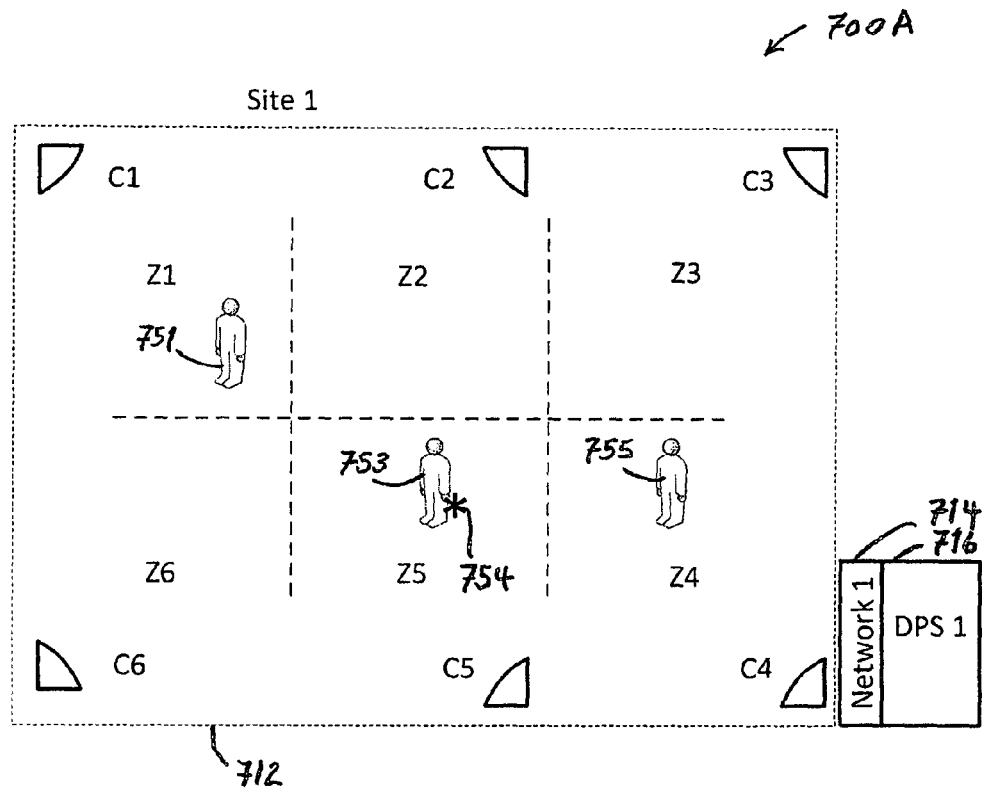
FIGS. 7A-D show an embodiment of the biometric notification system of FIG. 1 configured to provide location awareness and/or zone alert services.

In FIG. 7A, plural zones Z1-Z6 of a site 712 are monitored by respective cameras C1-C6 and a network 714 transports camera data to a data processing system 716 that may be local to the site or remote from the site. Persons 751, 753, 755 in respective zones Z1, Z5, Z4 are visible to cameras C1, C5, C4.

In FIG. 7B, indicia of a case in a case database 267 are shown. In various embodiments, a person is identified by one or more of an image, facial feature set, case group, and location or zone alert.

In FIG. 7C, criteria for triggering a message are shown. In various embodiments, trigger requirements include matching facial feature sets and other trigger requirements include a particular location and/or a particular case group.

In an embodiment, message trigger criteria include (i) a requirement that a person be matched with a case in the case database 267 and (ii) other message trigger criteria include a requirement that the matched person be discovered in a particular zone. Therefore, a message is not sent unless there is a match resulting from a video frame acquired in a particular zone. For example, if other message trigger criteria of a particular case CASEX identifying person 751 require only discovery in zone Z1, then a video frame acquired by camera C1 in zone Z1 that is matched with CASEX match triggers a message concerning the person 751. Note that the camera providing a video frame from which a first facial feature set is derived may be referred to as a match camera.

Message trigger criteria may include further requirements such as requiring the case group of the matched case be a particular case group and/or, requiring the match corresponds to a person known to site operators as a person of interest. For example, if other message trigger criteria of a particular case CASEX identifying person 751 require discovery in zone Z1 and a particular case group NOFLYLIST, then a video frame acquired by camera C1 in zone Z1 that is matched with CASEX triggers a message concerning person 751 only when indicia of CASEX include the NOFLYLIST case group.

Message recipients and or receiving devices of interested recipients may be determined as mentioned above and by any of case group, job junction, territory, receiving device, location, and the like.

Just as the message trigger may depend on the match location, so too can recipient(s) of the message be selected based on their location. For example, if persons 753 and 755 are site security personnel in a pool of potential message recipients, the BNS 700A may send the message to the receiving device 754 of person 753 because zone Z5 is closer to zone Z1 than is zone Z4.

In the above example, the BNS 700A may locate site personnel, for example by limiting the second feature sets available for comparison to those of site personnel.

Figure 7D:
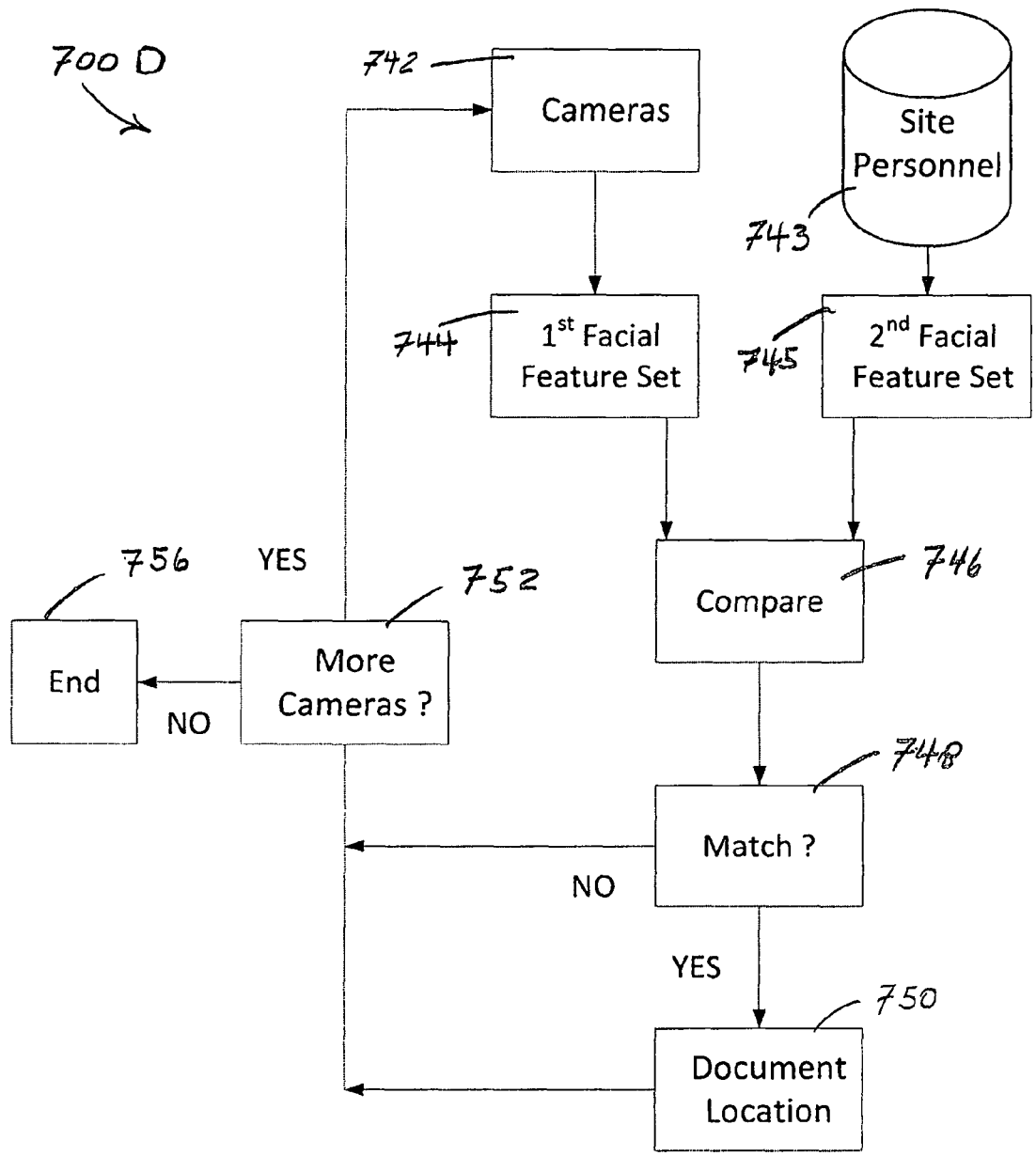

FIG. 7D illustrates a site personnel locator. In the camera block 742 video frames from all or a relevant subset of the site cameras, such as cameras in the discovery zone and adjacent zones, are acquired. First facial feature sets extracted from the video frames 744 are compared with second facial feature sets 745 available from a site personnel database 743. In various embodiments, records of the site personnel database identify site personnel. Each such record includes a facial feature set and other indicia such as one or more of name, number, image, job function, territory, and receiving device. Notably, the reference to "record" means not only individual database records, but in some embodiments related combinations of records for identifying a particular person.

The feature sets 744, 745 are compared 746. Where there is a match 748, the person's location is documented 750, and a test for more cameras to be checked is made 752. If more cameras are to be checked, the process returns to the cameras block 742, acquires another video frame, and repeats. Otherwise, the process ends 756.

Message content may include any of information from or derived from the camera, case database, data processing system, and other sources such as sources external to the BNS 700A. Message content may also be a function of variables such as case group, interested recipient, and zone.

In an embodiment, site personnel receive a first message portion and a second message portion. The first message portion includes an image of the matched person, the zone where video frame resulting in the match was acquired, and the time when the video frame was acquired. The second message portion depends on the case group which indicates what case information should be sent and what if any contemporaneous information such as warrant status should be acquired and sent.

Figure 8A:
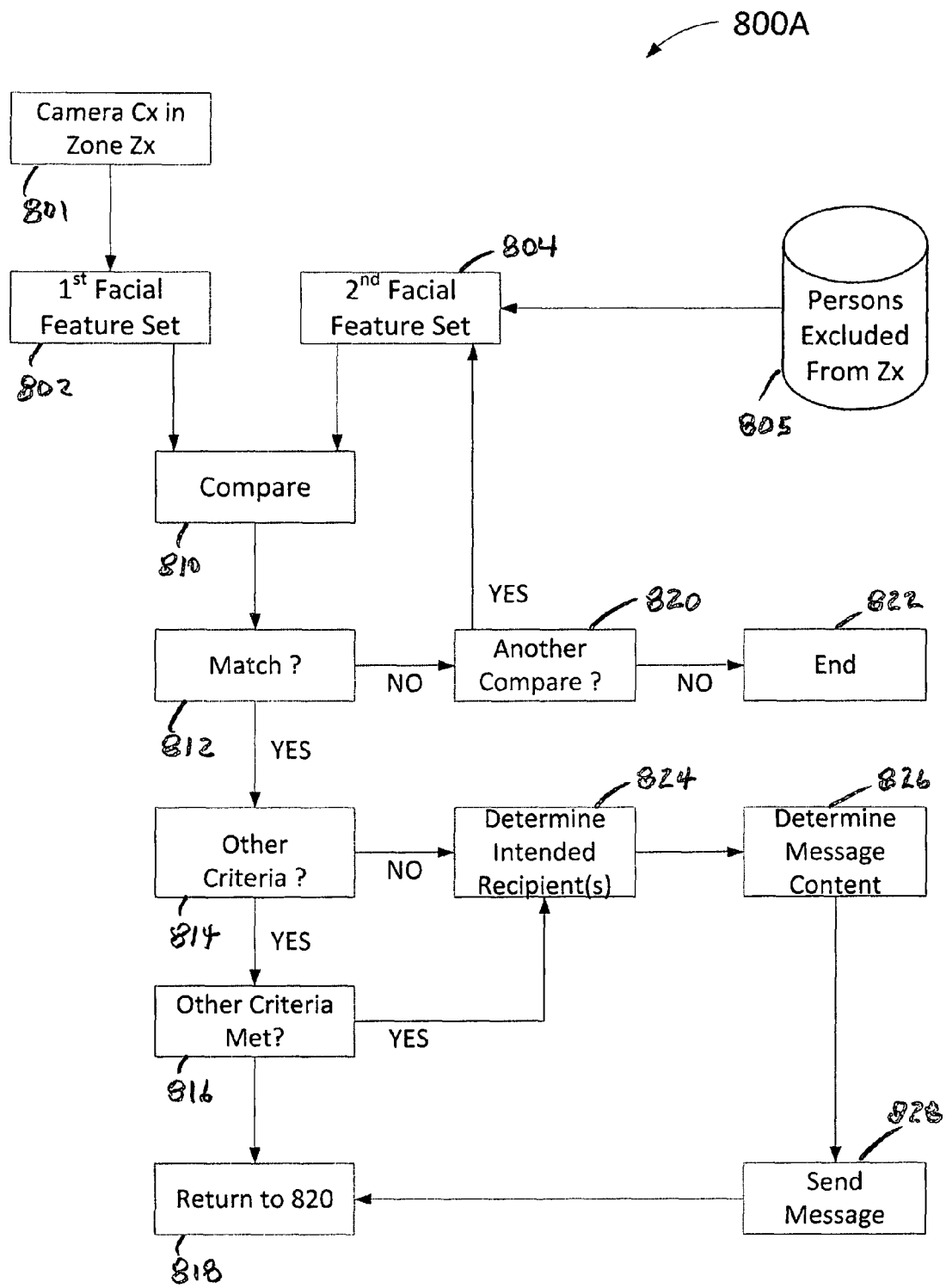

FIGS. 8A-B illustrate features of a BNS geofencing services 800A-B.

In the first geofencing service 800A of FIG. 8A, first and second facial feature sets are compared 810. The first facial feature set 802 is from a video frame acquired by a camera 801 such as a camera Cx in zone Zx. The second facial feature set 804 is from a data storage resource such as a database 805 that identifies persons to be excluded from zone Zx. In various embodiments, the second facial feature resource may be one or more of the case database 267, a subset of the case database 269, a site personnel database or its subset, another database or its subset, or another suitable data storage resource known to skilled artisans.

If after the comparison 810 the match test 812 indicates the compared facial feature sets do not match, then to the extent another second facial feature set is available from the database 805, the process begins again.

Because the database 805 provides facial feature sets of persons excluded from zone Zx, a comparison 810 that results in a match 812 meets at least the first criteria for sending a message. Other criteria 814 such as date, time, presence in zone Zx of a non-excluded person may also be considered. For example, where the geofence triggers messages only on certain days (e.g. weekend) or only at certain times (e.g. weekdays after 5 PM). For example where the geofence does not trigger messages when a non-excluded or authorized person is present in zone Zx.

Where there is a match 812 and other criteria, if any, are met 816, intended recipients are determined 824. Intended recipients may be determined by any of the methods described above. Further, intended recipients may be predetermined by geofence parameters that nominate particular persons, job functions, territories and/or their related receiving devices 180 to receive messages resulting from operation of the geofence.

In a determine message content step 826, fixed message content and or message content that varies, for example with the matched person and/or intended recipient, is determined.

The message content may be determined by any of the methods described above. Further, the message content may include one or more of the video frame that resulted in the match, the zone where and time when the frame was acquired, the name of the matched person, an image of the matched person, other identifying characteristics of the matched person, and instructions for confronting and/or dealing with the matched person.

In a send message step 828, the determined message(s) are sent to the receiving device(s) 180 of interested recipient(s). In a return step 818, the process returns to request another comparison in step 820. If there are no additional comparisons, the process ends at step 822.

In the second geofencing service 800B of FIG. 8B, first and second facial feature sets 832, 834 are compared in a primary comparison 840. The first facial feature set is from a video frame acquired by camera 831 such as camera Cy in zone Zy. The second facial feature set is from a data storage resource such as a database 835 that identifies persons not excluded from zone Zy or persons whose access to zone Zy is authorized. In various embodiments, the second facial feature resource may be one or more of the case database 267, a subset of the case database 269, a site personnel database or its subset, another database or its subset, or another suitable data storage resource known to skilled artisans.

If after the primary comparison 840 a primary match test 842 indicates the compared facial feature sets match, then to the extent another second facial feature set is available from the database 835, the process begins again.

Because the database 835 provides facial feature sets of persons not excluded from zone Zy, a primary comparison 840 that results in no match 842 meets at least the first criteria for sending a message. Other criteria 844 such as date and time, or as mentioned above and below, may also be considered. For example, where the geofence triggers messages only on certain days (e.g. weekend) or only at certain times (e.g. weekdays after 5 PM).

Because the message trigger criteria include a no match condition, a secondary matching process may be used to identify the person that was not matched. For example, the matching process of FIG. 6 may be performed as a secondary matching process (+/− without brackets at step 612) where the first facial feature set is from the image that resulted in no match and the second facial feature sets are those of the case database 267 or another database mentioned herein.

Where the primary match test 842 results in no match and other criteria 844, if any, are met 846, intended recipients are determined 854. Intended recipients may be determined by any of the methods described above. Further, intended recipients may be predetermined by geofence parameters that nominate particular persons, job functions, territories and/or their related receiving devices 180 to receive messages resulting from operation of the geofence.

In a determine message content step 856, fixed message content and or message content that varies, for example with the unmatched person and/or intended recipient, is determined. The message content may be determined by any of the methods described herein. Further, the message content may include one or more of the video frame that resulted in no match, the zone where and time when the frame was acquired, unmatched person identifiers including image, and instructions for confronting and/or dealing with the unmatched person.

In a send message step 858, the determined message(s) are sent to the receiving device(s) 180 of interested recipient(s). In a return step 848, the process returns to request another comparison in step 850. If there are no additional comparisons, the process ends at step 852.

Figure 9A:
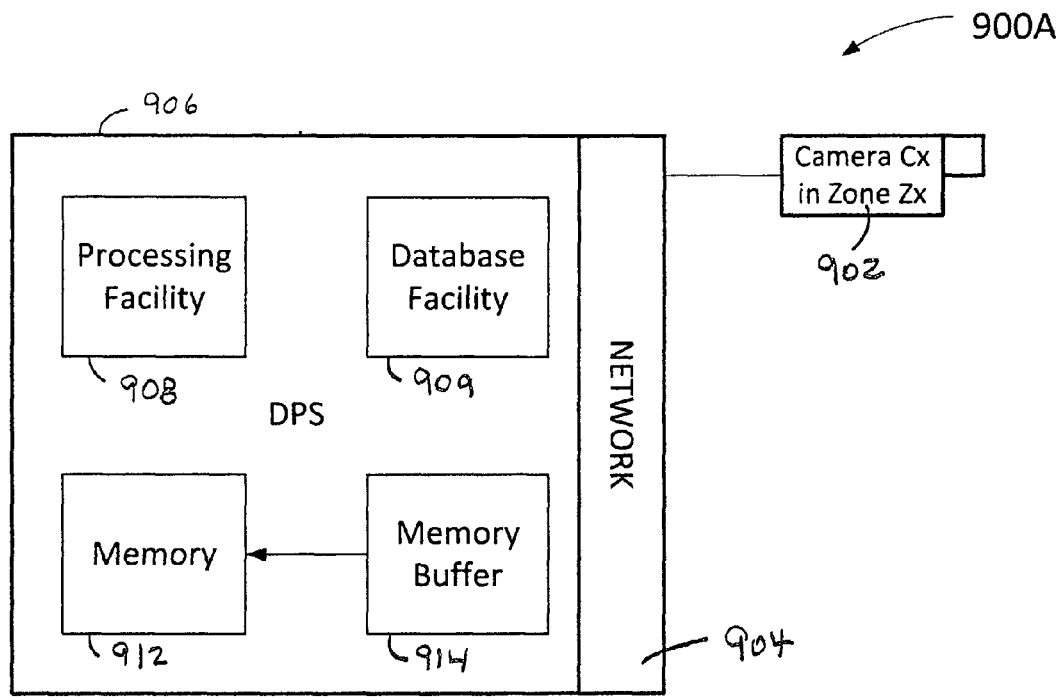
FIG. 9A shows an embodiment of the biometric notification system of FIG. 1 configured to provide intelligent video storage services.
Figure 9B:
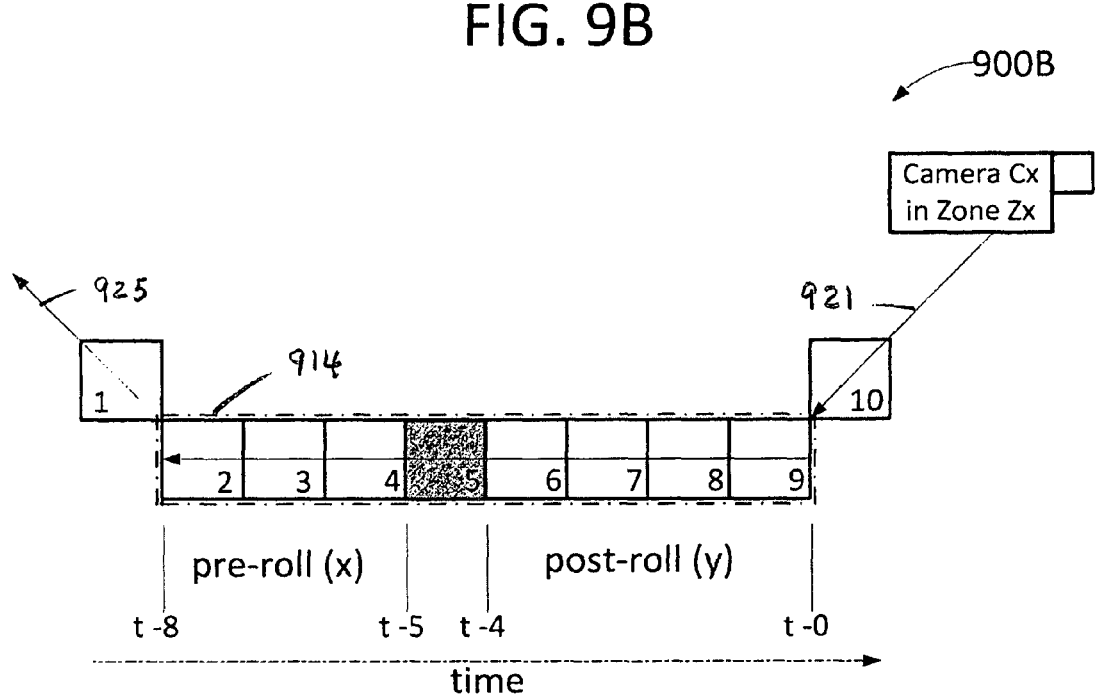
FIG. 9B shows conceptually first in-first out memory of the biometric notification system of FIG. 9A.

FIGS. 9A-B illustrate features of a BNS intelligent video storage service 900A-B.

FIG. 9A shows a BNS wherein a network 904 interconnects a data processing system ("DPS") 906 with one of plural cameras 902. In addition to a processing facility 908 and a database facility 909, the DPS may include memory for tasks such as video storage.

In various embodiments, the BNS 900A captures streams of video from one or more video cameras 902. Because copious amounts of memory are typically required for storing video streams, embodiments of the BNS provide for a memory buffer 914 and a memory 912 such as a video storage memory. The memory and memory buffer may be any of semiconductor memory such as random access memory, magnetic memory such as hard disk drive(s), and optical memory such as optical drive(s).

In some embodiments, blocks of video frames held by the memory buffer 914 are selectively moved to non-temporary storage 912 such as a disk drive. For example, the memory buffer 914 may be a First In, First Out ("FIFO") device such as a circular buffer that receives a stream of video frames captured by the camera 902. At any point in time $t_0$, the contents of the buffer may be saved to non-temporary storage such that images from an earlier time period $(t_{-x} \ldots t_0)$ are saved.

FIG. 9B illustrates video frames in a buffer 900B. Here, a first in-first out memory buffer 914 provides space for eight video frames. As shown, a frame [10] leaving the camera is an enqueue frame 921 and a frame [1] leaving the buffer is a dequeue frame 925. Between the enqueue and dequeue frames are frames [2 . . . 9] in time window $(t_{-8} \ldots t_{-0})$ held within the buffer memory 914. Notably, the buffer may be managed to enqueue and to dequeue entire blocks of data, for example where each block of data encompasses an entire video frame.

In an embodiment, a sequential stream of video frames from the video camera 902 is received by a buffer 914 and the buffer contents, frames [2 . . . 9], are saved in a non-temporary video storage memory 912 when a second facial feature set (e.g., 604) is matched with a first facial feature set (e.g., 602) derived from a target frame [5] in the buffer. As can now be appreciated, a decision to save the buffer saves pre-roll frames [2-4], target frame [5], and post-roll frames [6-9].

In various embodiments, a receiving device of an interested recipient (e.g., 180) that receives a message triggered by the match receives with the message video derived from buffer contents or a hyperlink for viewing video derived from the buffer contents.

The size of a buffer memory 914 may be fixed or variable. For example, if a time period $t_a$ is chosen, then the buffer may be sized to accommodate x pre-roll frames and y post-roll frames. For example, where x pre-roll frames occupy a time period $t_{pre}=(t_{-8} \ldots t_{-5})$ and y post-roll frames occupy a time period $t_{post}=(t_{-4} \ldots t_0)$, the buffer may be sized for $t_{pre} \geq t_a$ and $t_{post} \geq t_a$. The chosen time period $t_a$ may be any of (i) a function of the time to match a first facial feature (see e.g., 602) set with a second facial feature set (see e.g., 604), (ii) a function of the time to match a first facial feature set with a fixed number of second facial feature sets, and (iii) a function of the time to match a first facial feature set with a variable number of second facial feature sets wherein $t_a$ becomes a variable. Notably, the buffer may be symmetric about the target frame or not (as shown).

In an embodiment, at the time a match is completed (see e.g., FIG. 6), a FIFO circular memory buffer holds x pre-roll frames and y post-roll frames, each of the x frames and y frames acquired during a respective acquisition time period t1, t2 in excess of a time period t3 required to compare a first facial feature set of the target frame with all of the cases in a database (or database subset) such as the case database 267 (or a case database subset 269).

And, in an embodiment plural circular memory buffers receive sequential video streams from respective video cameras that monitor zones adjacent to zone Zx and these buffer contents are saved in video storage memory when the buffer contents are saved.

Figure 10:
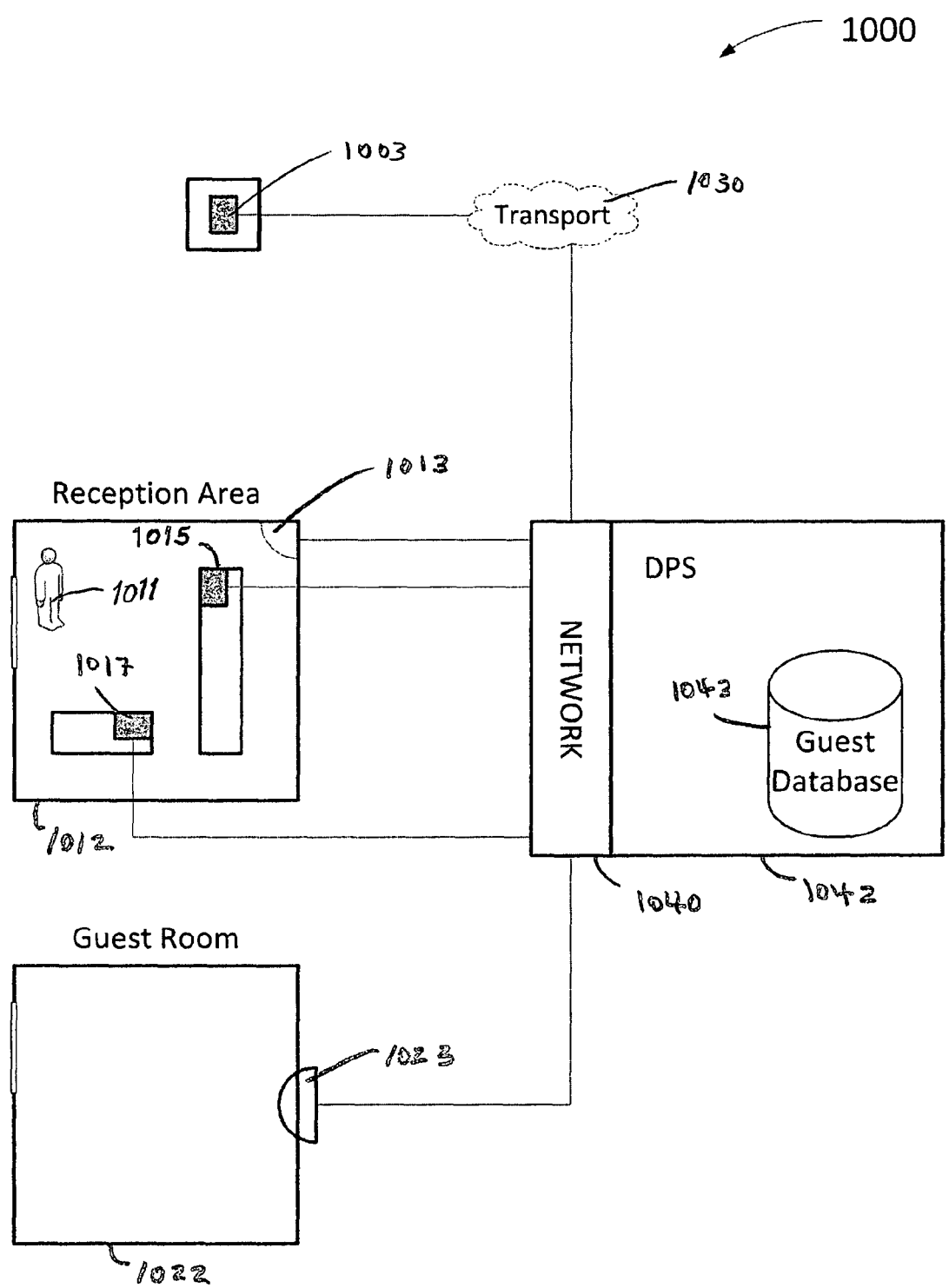
FIG. 10 shows an embodiment of the biometric notification system of FIG. 1 configured to provide preference services.

FIG. 10 illustrates features of a BNS preference service 1000. In general, preference services are directed to the care, preferences, and/or environment of a particular person or group of persons. The example of FIG. 10 illustrates features of a preference service operating in guest accommodations such as a hotel.

As shown in the figure, a network 1040 interconnects devices such as receiving devices of interested recipients (see e.g., 180) with a data processing system 1042 similar to the DPS 200 of FIG. 2. The devices are located in a reception area 1012 and in a guest room 1022. In some embodiments a guest device such as a wireless device 1003 is used to access the network.

The DPS includes a guest database 1043 for identifying a particular guest via information such as name, image, facial feature set and other particulars such as organization, personal information, booking information, automobile, preferences, history, and other information. Guest identifying information may be stored in one or plural related database record(s).

When a guest 1011 known to the DPS 1042, that is an expected guest, arrives in the hotel reception area 1012, a camera 1013 acquires a video frame including the guest and the DPS matches the guest (see e.g., FIG. 6) with a guest record in the guest database 1043. Other criteria required to trigger messages may be based on various checks and confirmations such as comparing current and booking dates and comparing current and booking time of arrival.

When the requirements for triggering messages are met, messages are sent to the receiving devices of interested recipients 180. In an embodiment, first and second messages are sent. The first message content includes identification of the guest by name and image and is directed to the receiving devices of greeting staff such as reception desk staff 1015 and concierge staff 1017.

The second message content includes controller instruction(s) for adjusting and/or controlling operation of one or more appliances 1023 in the guest room 1022 assigned to the matched guest. Appliances include comfort devices such as heating ventilation and air conditioning, lighting devices such as electric lighting and window curtains, and entertainment devices such as audio systems and video systems.

In various embodiments, one or more user preferences may be entered in a guest database record by the guest or an agent of the guest. For example, a guest may at the time of booking or at another time use a suitable Internet 1030 access device 1003 such as a wireless device to access the hotel booking system to select guest preferences such as room comfort, lighting, and entertainment.

FIGS. 11A-F illustrate features of an archive service 1100A-F. In various embodiments, the archive service provides data storage for one or more of video frames, information derived from video frames, related metadata, and other information.

Figure 11A:
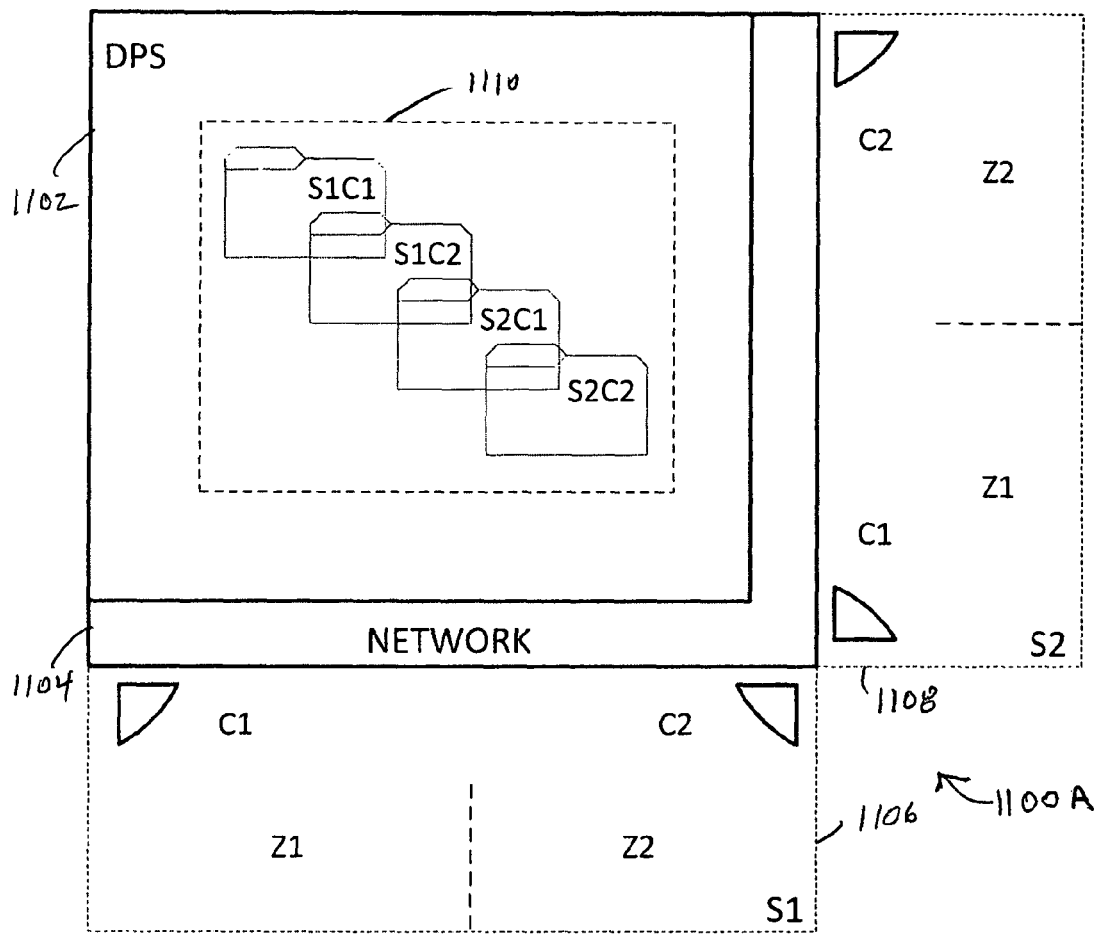

FIG. 11A shows a BNS serving one or multiple sites. A network 1104 interconnects a data processing system 1102 and one 1106 or more 1108 sites.

The DPS 1102 may be similar to the DPS 160 of FIG. 2 and further includes an archive memory 1110 such as online or offline storage facility using any one or more of the memory technologies described above, for example disk drives. DPS locations may be proximate or within a site and remote with respect to one or multiple sites using long distance or wide area network data transport such as the wired or wireless data transport means described above.

The network 1104 may be similar to the network 140 of FIG. 2. In an embodiment, the network interconnects the DPS 1102 with a first site S1. And, in an embodiment the network interconnects the DPS with a first site S1 and a second site S2 (as shown).

The sites are divided into zones such that site 1 includes zones Z1, Z2 monitored by respective cameras C1, C2 and site 2 includes zones Z1, Z2 monitored by respective video cameras C1, C2. In the figures, designations such as S1C1, S2C1 distinguish the cameras of site 1 from those of site 2.

In various embodiments, the archive memory 1110 provides storage in a database(s), database subsets, files, and other suitable means of memory utilization known to skilled artisans. In the embodiment shown, a folder analogy is used. In particular, storage usage is depicted with folders for each of four cameras, S1C1, S1C2, S2C1, S2C2.

Folder content includes information derived from cameras and in various embodiments video frame streams such as continuous video and sequential sets of video frames such as frames acquired at particular time intervals, for example 1 frame/second.

Figure 11B:
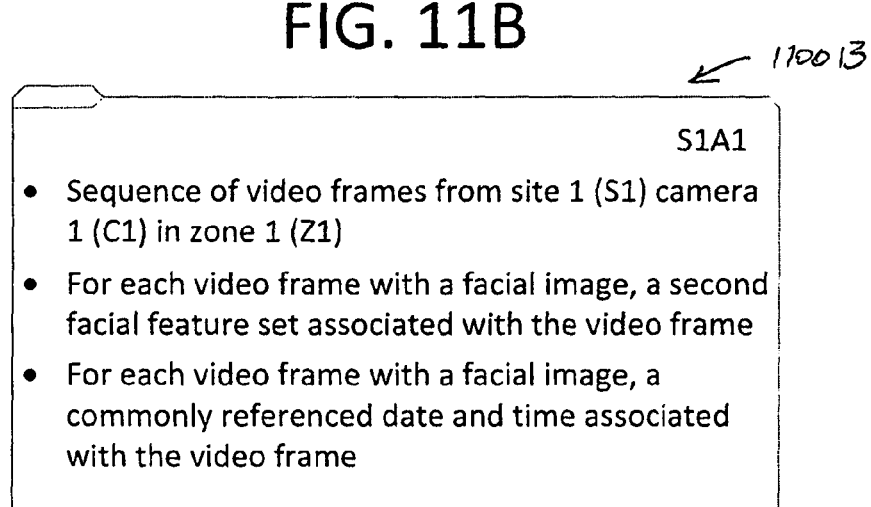

FIG. 11B shows an embodiment of an archive folder. Here, the folder S1A1 contains a sequence of blocks such as blocks including video frames. In various embodiments, video frames are acquired from site 1 (S1) camera 1 (C1) in zone 1 (Z1) such as a sequence acquired over a substantial time period, for example during site working hours over a period of weeks, months, or years.

For each video frame with a facial image, a second facial feature set is associated with the video frame. For example, second facial feature sets may be obtained 404 in an online or off-line process that is contemporaneous with video frame acquisition or not. And, for each video frame with a facial image, a commonly referenced date and time may be associated with the video frame.

Notably, folder SxCx may receive only frames with a facial image, any other frames being discarded or redirected beforehand. In an alternative mode, frames without a facial image may be purged from the folder.

In an embodiment, an archive service builds an archive in plural folders SxCx of an archive memory 1110. Each archive folder may receive sequential video frames from a respective video camera Cx in zone Zx at site Sx. For each video frame including a facial image, a second facial feature set is derived from the facial image of the video frame and a commonly referenced date time and stamp is associated with the video frame. This information provides a means for tracking a particular individual or person of interest. For example, comparing the first facial feature set of the person of interest with the second facial feature sets of the video archive identifies video frames where the person of interest is present. Matched video frames may be loaded chronologically into a playback folder for tracking the person of interest.

Figure 11C:
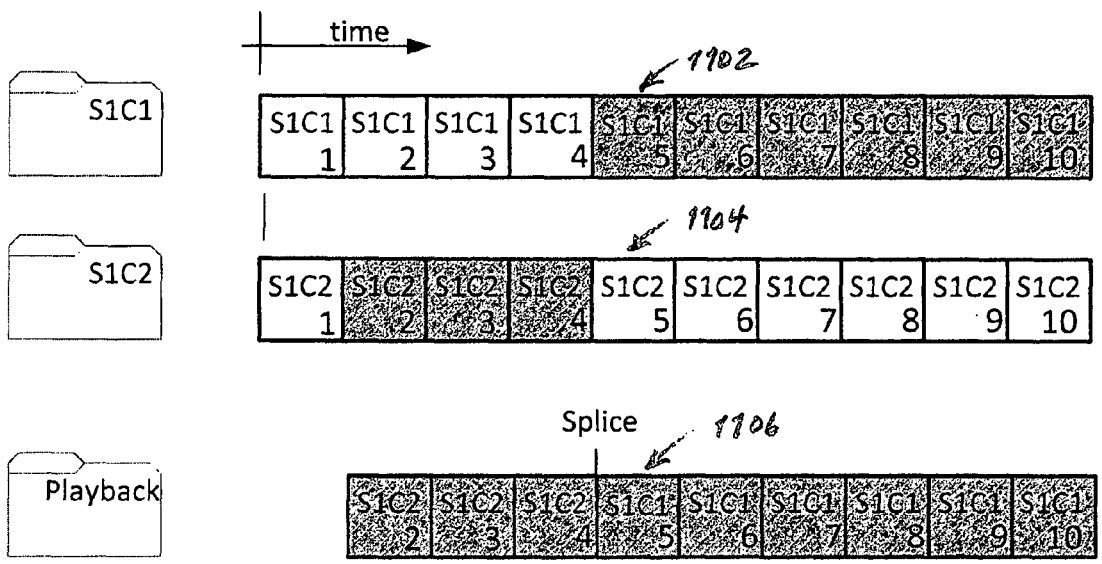

FIG. 11C shows storage folders and a playback folder of an archive service 1100C. The storage folders S1C1, S1C2 provide data and metadata storage for information associated with cameras C1, C2 at site 1. Folders S1C1, S2C2 store blocks of information 1102, 1104, for example sequential blocks corresponding to a chronological sequence of video frames beginning Oct. 1, 2014, 11:50 PM UTC.

The storage folders S1C1, S1C2 may store blocks of data (blocks 1-10 shown). Each block includes or refers to data or indicia of one or more of a video frame, a facial image obtained from the video frame, a second facial feature set derived from the facial image, a commonly referenced time and date stamp, a site identifier, a camera identifier, and a zone identifier. Crosshatched block sequences S1C1 (5-10) and S1C2 (2-4) indicate matched block sequences wherein a second facial feature in each of these blocks matches a first facial feature set of a person of interest.

In an embodiment, a playback folder (not shown) is loaded with video frames corresponding to S1C1 (5-10) for playback in chronological order. This embodiment provides, for example, tracking in a single zone Z1 at site 1.

In another embodiment, the playback folder is loaded with a spliced sequence of video frames. Here, video frames S1C2 (2-4) spliced with the video frames of S1C1(5-10) are loaded into the playback folder for playback in chronological order. This embodiment provides, for example, tracking in multiple zones Z1, Z2 at site 1.

Figure 11D:
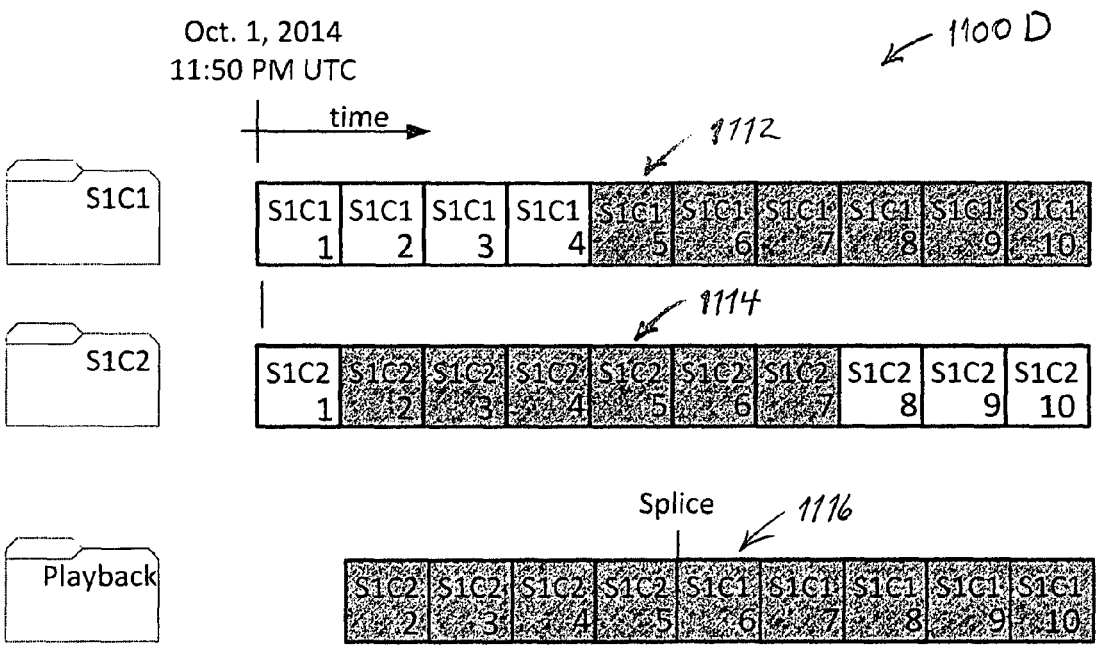

FIG. 11D shows an archive service with a first automated video splicing feature 1100D. Here, the contents 1112 and 1114 of the folders S1C1, S1C2 overlap chronologically such that three blocks (5-7) of S1C1 overlap with three blocks (5-7) of S1C2. The overlap might be eliminated by splicing the matched blocks (2-7) of S1C2 with the matched blocks (5-10) of S1C1. However, to the extent a chronological sequence of blocks is desired, some blocks must be eliminated. In a first embodiment, sufficient blocks are removed to eliminate the overlap.

In a second embodiment blocks are removed such that S1C2 blocks are spliced with S1C1 blocks at an approximate overlap midpoint, here block 6. In particular, blocks S1C2 (6-7) are removed and block S1C1 (5) is removed such that a splice occurs between blocks S1C2 (5) and S1C1 (6). This results in a chronological sequence of matched blocks, S1C2 (2) through S1C1(1), being loaded into the playback folder 1116. These embodiments provide, for example, tracking in multiple zones Z1, Z2 at site 1 with elimination of overlaps to provide a strictly chronological playback sequence.

Figure 11E:
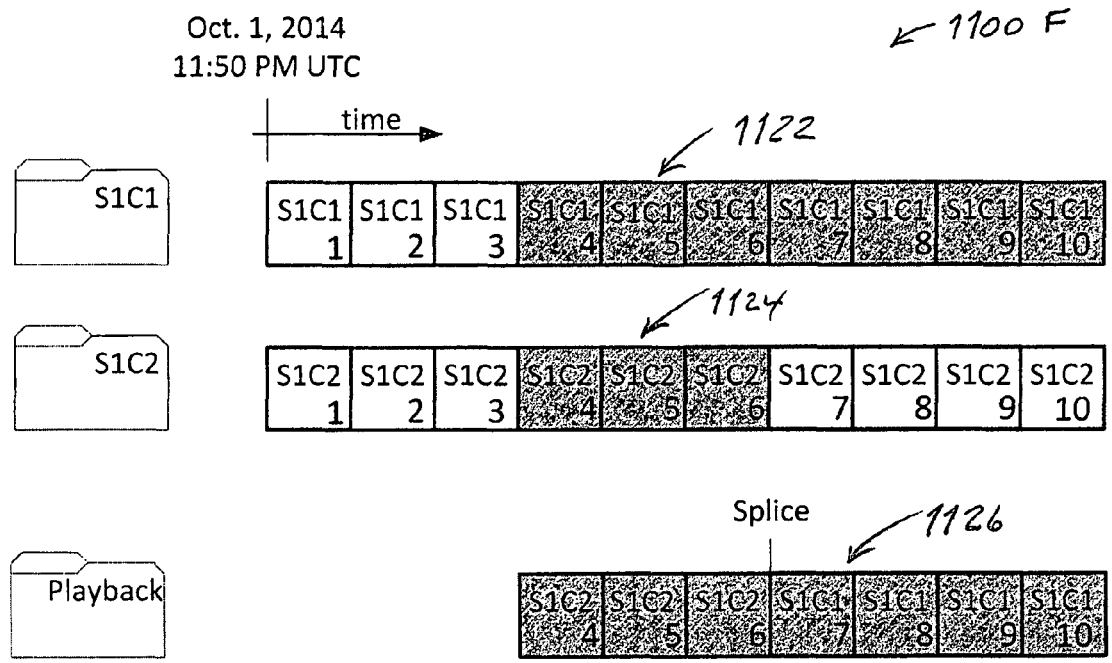

FIG. 11E shows an archive service with a second automated video splicing feature 1100E. Here, the contents 1122 and 1124 of the folders S1C1, S1C2 overlap chronologically such that three matched blocks (4-6) of S1C1 overlap with three matched blocks (4-6) of S1C2.

As seen, the initial blocks S1C1 (4), S1C2 (4) overlap temporally. In an embodiment, the longer of the two block sequences S1C1 (4-10) is loaded into the playback folder. This embodiment provides, for example, tracking in single zone Z1 at site 1.

In other embodiments, the two block sequences S1C1 (4-10) and S1C2 (4-6) are spliced with some blocks removed to provide, for example, a strictly chronological playback sequence. One such embodiment gives preference to the blocks of the camera closest to the person of interest, determined for example via comparison of facial areas in the initial blocks of each block sequence, the larger of the compared areas determining the preference.

The figure illustrates one such assemblage of playback frames 1126 where the initial block (4) of the matched blocks S1C2 (4-6) is determined to have a larger facial image than the initial block (4) of the matched blocks S1C2 (4-10). As seen, blocks S1C1 (4-6) are removed and sequences S1C2 (4-6) and S1C1 (7-10) are joined at a splice. In other embodiments, once the preferred block sequence is determined, the splice may be located by any suitable method including suitable methods described above. These embodiments provide, for example, tracking in multiple zones Z1, Z2 at site 1 with selection of a preferred block sequence and elimination of overlaps to provide a strictly chronological playback sequence.

As shown in FIG. 11A above, the archive service is not limited to a single site. Rather, the embodiments of FIGS. 11C-E might just as easily be used to assemble a playback folder where cameras including camera C1 are located at a first site and cameras including camera C2 are located at a second sight. Moreover, irrespective of the site locations such as inter campus, intercity, interstate or intercountry, embodiments utilizing a common time base such as a commonly referenced UTC time stamps enables assemblage of a chronological sequence of video frames in a playback folder.

FIG. 11F shows a multisite archive service with an automated video splicing feature 1100F. Here, each of two sites S1, S2 have multiple cameras, for example site 1 cameras C1, C2 and site 2 cameras C1, C2. Archive folders corresponding to the cameras are S1C1, S1C2, S2C1, S2C2 (see e.g., FIG. 11A).

Folder S1C1 contains blocks (1-10) 1132 corresponding to camera C1 and with matched blocks (5-8). Folder S1C2 contains blocks (1-10) 1134 corresponding to camera C2 and with matched blocks (4-6). Folder S2C1 contains blocks (1-10) 1142 corresponding to camera C3 and with matched blocks (4-5). Folder S2C2 contains blocks (1-10) 1144 corresponding to camera C4 and with matched blocks (1-4). The matched blocks corresponding with site 1 cameras overlap at blocks (5, 6) and the matched blocks corresponding with site 2 cameras overlap at block (4).

As seen in the playback folder contents 1146, matched frames from each of cameras C1-C4 are assembled in a chronological sequence such that a person of interest can be observed moving from zone Z2 to zone Z1 at site 1 and later moving from zone Z2 to zone Z1 at site 2. Notably, from the 13 matched blocks, a corresponding set of 13 video frames was reduced to a set of 10 sequential video frames. These frames appear in the contents 1136 of the video playback folder.

In the video playback folder 1146, splices are shown between video frame pairs S1C2 (5):S1C16 and S2C2 (3):S1C1(4). These splices result from eliminating the overlap of video frames corresponding with (i) site 1 cameras C1, C2 and (ii) site 2 cameras C1, C2. Frames may be removed by any suitable method including suitable methods mentioned above. Where, as here, video frames from multiple sites are available, site splices such as third splice S1C1 (8):S2C2 (1) may be used to join the sequences of video frames.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. A biometric notification system ("BNS") with facial recognition and related services, the system comprising:
plural digital video cameras ($C_1, C_2 \ldots C_n$) that monitor respective zones ($Z_1, Z_2 \ldots Z_n$) at a first site;
a data processing system including a processing facility and a database facility;
a network interconnecting the video cameras and the data processing facility;
a video frame acquired from a video camera $C_x$ in zone $Z_x$ includes a first content;
a first facial feature set derived from the first content;
a database of the database facility includes plural cases, each case identifies a person by linking a name with a second content, a second facial feature set, and a case group;
a matched case discovered when the processing facility finds the first feature set matches a second feature set;
a message sent to one or more interested recipients when the processing facility finds that message trigger criteria are met;
wherein message trigger criteria include a requirement that a matched case is discovered;
a service for recognizing persons of interest;
wherein the message trigger criteria include a requirement that the case group of the matched case identify a person known to site operators as a person of interest;
a recipient selection service based on a case group/user group association;
wherein the interested recipients are limited to members of one or more user groups, each such user group associated with a case group of the matched case;
a service for selecting an interested recipient based on proximity to an event;
wherein the first site is a building, $Z_x$ includes a locked door, a person in the video frame is matched with a case including an authorized entry case group, the interested recipient is limited to a building occupant that is closest to the door, and a notification module message instructs the interested recipient to grant access to the particular person identified in the matched case; and,
wherein the BNS determines the building occupant closest to the door by limiting the cases available for comparison to site staff and by searching zone Zx and adjacent zones for a matched case.

2. A biometric notification system ("BNS") with facial recognition and related services, the system comprising:
plural digital video cameras ($C_1, C_2 \ldots C_n$) that monitor respective zones ($Z_1, Z_2 \ldots Z_n$) at a first site;
a data processing system including a processing facility and a database facility;
a network interconnecting the video cameras and the data processing facility;
a video frame acquired from a video camera $C_x$ in zone $Z_x$ includes a first content;
a first facial feature set derived from the first content;
a database of the database facility includes plural cases, each case identifies a person by linking a name with a second content, a second facial feature set, and a case group;
a matched case discovered when the processing facility finds the first feature set matches a second feature set;
a message sent to one or more interested recipients when the processing facility finds that message trigger criteria are met;
wherein message trigger criteria include a requirement that a matched case is discovered;
a zone alert service;
wherein plural cases include respective different zone alerts;
wherein when a matched case includes a zone alert, message trigger criteria include a requirement that a zone identified by the zone alert correspond with the zone where the first content was acquired; and,
wherein the intended recipients are selected based on job function and territory, the pool of potential recipients representing multiple different job functions and multiple different territories.

3. A biometric notification system ("BNS") with facial recognition and related services, the system comprising:
plural digital video cameras ($C_1, C_2 \ldots C_n$) that monitor respective zones ($Z_1, Z_2 \ldots Z_n$) at a first site;
a data processing system including a processing facility and a database facility;
a network interconnecting the video cameras and the data processing facility;
a video frame acquired from a video camera $C_x$ in zone $Z_x$ includes a first content;
a first facial feature set derived from the first content;
a database of the database facility includes plural cases, each case identifies a person by linking a name with a second content, a second facial feature set, and a case group;
a matched case discovered when the processing facility finds the first feature set matches a second feature set;
a message sent to one or more interested recipients when the processing facility finds that message trigger criteria are met;
wherein message trigger criteria include a requirement that a matched case is discovered;
a first geofencing service for recognizing a person excluded from a zone;
wherein only a subset of the cases in the database is available for comparison with the first feature set, the subset of cases consisting of persons excluded from zone $Z_x$; and,
wherein discovery of a matched case results in a message being sent to site security, the message advising the occurrence of a security breach and a name, image, and zone of the person of the matched case.

4. A biometric notification system ("BNS") with facial recognition and related services, the system comprising:
plural digital video cameras ($C_1, C_2 \ldots C_n$) that monitor respective zones ($Z_1, Z_2 \ldots Z_n$) at a first site;
a data processing system including a processing facility and a database facility;
a network interconnecting the video cameras and the data processing facility;
a video frame acquired from a video camera $C_x$ in zone $Z_x$ includes a first content;
a first facial feature set derived from the first content;
a database of the database facility includes plural cases, each case identifies a person by linking a name with a second content, a second facial feature set, and a case group;
a matched case discovered when the processing facility finds the first feature set matches a second feature set;
a message sent to one or more interested recipients when the processing facility finds that message trigger criteria are met;
wherein message trigger criteria include a requirement that a matched case is discovered;
a second geofencing service for recognizing a person not excluded from a zone;

wherein only a subset of cases in the database is available for comparison with a first feature set, the subset of cases consisting of persons not excluded from zone $Z_x$; and, wherein failure to discover a matched case results in a message being sent to site security, the message advising the occurrence of a security breach and an image and zone of the person that could not be matched.

5. A biometric notification system ("BNS") with facial recognition and related services, the system comprising:

plural digital video cameras ($C_1, C_2 \ldots C_n$) that monitor respective zones ($Z_1, Z_2 \ldots Z_n$) at a first site;

a data processing system including a processing facility and a database facility;

a network interconnecting the video cameras and the data processing facility;

a video frame acquired from a video camera $C_x$ in zone $Z_x$ includes a first content;

a first facial feature set derived from the first content;

a database of the database facility includes plural cases, each case identifies a person by linking a name with a second content, a second facial feature set, and a case group;

a matched case discovered when the processing facility finds the first feature set matches a second feature set;

a message sent to one or more interested recipients when the processing facility finds that message trigger criteria are met;

wherein message trigger criteria include a requirement that a matched case is discovered;

a first intelligent video storage service;

wherein a sequential stream of video frames from a match camera $C_x$ is received by a circular memory buffer and the buffer contents $B_x$ are saved in video storage memory when the second facial feature set is matched with the first facial feature set derived from a target frame in the circular memory buffer; and, wherein an interested recipient that receives a message triggered by the match receives with the message a hyperlink for viewing the buffer contents saved in video memory storage.

6. The BNS of claim 5 wherein at the time the match is completed, the circular memory buffer holds x frames acquired before the target frame, pre-roll frames", and y frames acquired after the target frame, post-roll frames", each of the x frames and the y frames acquired during a respective acquisition time period t1, t2 in excess of a time period t3 required to compare the first facial feature set of the target frame with all of the cases in the database.

7. The BNS of claim 5 wherein the circular buffer size varies with the number of second facial feature sets available for comparison with the first facial feature set of the target frame.

8. The BNS of claim 5 wherein plural circular memory buffers receive sequential video streams from respective cameras that monitor zones adjacent to Zx and these buffer contents are saved in video storage memory when the buffer contents Bx are saved.

9. A biometric notification system ("BNS") with facial recognition and related services, the system comprising:

plural digital video cameras ($C_1, C_2 \ldots C_n$) that monitor respective zones ($Z_1, Z_2 \ldots Z_n$) at a first site;

a data processing system including a processing facility and a database facility;

a network interconnecting the video cameras and the data processing facility;

a video frame acquired from a video camera $C_x$ in zone $Z_x$ includes a first content;

a first facial feature set derived from the first content;

a database of the database facility includes plural cases, each case identifies a person by linking a name with a second content, a second facial feature set, and a case group;

a matched case discovered when the processing facility finds the first feature set matches a second feature set;

a message sent to one or more interested recipients when the processing facility finds that message trigger criteria are met;

wherein message trigger criteria include a requirement that a matched case is discovered;

a user preference service; and, wherein the first site is a hotel and the camera Cx is located in a hotel reception area Zx, first and second messages are sent when a matched case includes a case group that identifies the person as an expected guest, the first message content includes identification of the guest by name and image and a recipient interested in the first message is a hotel staff member, and the second message content includes a controller instruction for adjusting operation of an appliance located in the hotel room of the recognized guest.

10. A biometric notification system ("BNS") with facial recognition and related services, the system comprising:

plural digital video cameras ($C_1, C_2 \ldots C_n$) that monitor respective zones ($Z_1, Z_2 \ldots Z_n$) at a first site;

a data processing system including a processing facility and a database facility;

a network interconnecting the video cameras and the data processing facility;

a video frame acquired from a video camera $C_x$ in zone $Z_x$ includes a first content;

a first facial feature set derived from the first content;

a database of the database facility includes plural cases, each case identifies a person by linking a name with a second content, a second facial feature set, and a case group;

a matched case discovered when the processing facility finds the first feature set matches a second feature set;

a message sent to one or more interested recipients when the processing facility finds that message trigger criteria are met;

wherein message trigger criteria include a requirement that a matched case is discovered;

an archive memory with plural archive folders; and, a service for building an archive in the archive memory;

wherein (i) each archive folder receives sequential video frames from a respective video camera Cx in zone Zx and (ii) for each video frame including a facial image, a second facial feature set derived from the facial image is associated with the video frame and a commonly referenced date time and stamp is associated with the video frame.

11. The BNS of claim 10 further comprising:

a particular person of interest;

wherein a facial feature set of the particular person of interest is compared with the facial feature sets of archive folders and matched folders are identified;

wherein the video frames of the matched folders are arranged for playback in chronological order.

12. The BNS of claim 11 further comprising:

a first automated video editing feature;

wherein if the sequence of frames from a first camera to see the person of interest overlaps chronologically with a sequence of frames from a second camera to see the person of interest, then sufficient frames are removed from the overlap to eliminate the overlap.

13. The BNS of claim 12 wherein the first and second camera frames that are removed result in a splice of the first camera frames to the second camera frames at an approximate overlap midpoint.

14. The BNS of claim 12 further comprising:
proximity sensing for determining a distance between the camera and the person of interest; and,
a second automated video editing feature;
wherein if the initial frame of the first camera frame sequence and the initial frame of the second camera frame sequence are temporally coincident, then the frame sequences are spliced to provide playback of frames of the camera closest to the person of interest before playback of frames of the other camera.

* * * * *